US012717476B2

(12) United States Patent
Kim et al.

(10) Patent No.: US 12,717,476 B2
(45) Date of Patent: Aug. 25, 2026

(54) STORAGE DEVICE INCLUDING THE VOLATILE MEMORY AND OPERATING METHOD OF STORAGE DEVICE

(71) Applicant: SK hynix Inc., Gyeonggi-do (KR)

(72) Inventors: Dong-Gun Kim, Gyeonggi-do (KR); Nam Hyun Yun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 19/048,945

(22) Filed: Feb. 9, 2025

(65) Prior Publication Data

US 2026/0086715 A1 Mar. 26, 2026

(30) Foreign Application Priority Data

Sep. 23, 2024 (KR) ........................ 10-2024-0128119

(51) Int. Cl.
*G06F 3/06* (2006.01)

(52) U.S. Cl.
CPC .......... *G06F 3/0608* (2013.01); *G06F 3/0659* (2013.01); *G06F 3/0673* (2013.01)

(58) Field of Classification Search
CPC ..... G06F 3/0608; G06F 3/0659; G06F 3/0679
USPC .......................................................... 711/154
See application file for complete search history.

(56) References Cited

U.S. PATENT DOCUMENTS

| | | | | |
|---|---|---|---|---|
| 10,999,223 | B1 | 5/2021 | Jain et al. | |
| 11,308,171 | B2 | 4/2022 | Chiu et al. | |
| 2016/0078051 | A1* | 3/2016 | Kim | G06F 16/245 707/690 |
| 2017/0124729 | A1* | 5/2017 | Gu | G06T 9/00 |
| 2023/0315323 | A1* | 10/2023 | Yoshii | G06F 3/0608 711/154 |

FOREIGN PATENT DOCUMENTS

KR 10-2267477 B1 6/2021

* cited by examiner

*Primary Examiner* — Than Nguyen
(74) *Attorney, Agent, or Firm* — IP & T GROUP LLP

(57) ABSTRACT

A storage device comprises: a compression operation unit configured to generate compression data by compressing management request data, wherein a compression size of the compression data is determined based on properties of the management request data; and a control operation unit configured to divide a plurality of physical regions in a volatile memory into first and second physical regions; assign, to the second physical regions, a plurality of selection regions based on an N reference storage space size; set a retention region based on a difference between the compression size and the reference storage space size, among the first physical regions; generate logical information indicative of the retention region; store multiple data items of the compression data and the logical information in a request selection region; and store remaining data items of the compression data in the retention region.

20 Claims, 12 Drawing Sheets

STORAGE DEVICE INCLUDING THE VOLATILE MEMORY AND OPERATING METHOD OF STORAGE DEVICE

CROSS-REFERENCE TO RELATED APPLICATION

This application claims priority under 35 U.S.C. § 119(a) to Korean Patent Application No. 10-2024-0128119, filed in the Korean Intellectual Property Office on Sep. 23, 2024, the entire contents of which are incorporated herein by reference.

BACKGROUND

1. Field

Various embodiments in the disclosure relate to a storage device, and particularly, to a storage device including volatile memory and an operating method of the storage device.

2. Discussion of the Related Art

Memory systems may refer to storage devices embodied using a semiconductor such as silicon (Si), germanium (Ge), gallium arsenide (GaAs), indium phosphide (InP), or the like. The memory systems are generally classified into volatile memory devices and nonvolatile memory devices. A volatile memory device is configured to lose data stored therein when power supply is interrupted. Representative examples of the volatile memory device include a static RAM (SRAM), a dynamic RAM (DRAM), a synchronous DRAM (SDRAM), etc. A nonvolatile memory device is configured to retain data stored therein even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories may include a NOR-type flash memory and a NAND-type flash memory.

A storage device may further include a controller (i.e., a memory controller) for controlling a memory (for example, a volatile memory/a nonvolatile memory), and such a controller may receive a command from an external device (i.e., a host), and perform data read, write, and erase operations on a memory included in the storage device based on the received command or control the operations.

On the other hand, the size of memory capacity required in a computing system continues to increase. In particular, in the case of a volatile memory having a higher price per capacity than a nonvolatile memory, increasing the size of memory capacity is more difficult.

Therefore, a method for compressing and storing data stored in the volatile memory included in the storage device has been proposed.

SUMMARY

Various embodiments are directed to a storage device capable of retaining write data in internal volatile memory by compressing the write data and an operating method of the storage device.

The problems to be solved by the present disclosure are not limited to the above-mentioned problems, and the other unmentioned problems will be clearly understood from the following description by those skilled in the art.

In an embodiment of the present disclosure, a storage device may include: volatile memory comprising a plurality of physical regions each comprising a plurality of storage space; a compression operation unit configured to generate compression data by compressing management request data, among a plurality of write data, wherein a compression size of the compression data is determined based on properties of the management request data; and a control operation unit configured to: divide the plurality of physical regions into first and second physical regions; assign, to the second physical regions, a plurality of selection regions based on an N reference storage space size in accordance with each of the plurality of write data; set, as a retention region, M regions determined based on a difference between the compression size and the reference storage space size, among the first physical regions, when the compression size is greater than the reference storage space size; generate logical information indicative of the retention region; store multiple data items of the compression data and the logical information in a request selection region corresponding to the management request data, among the plurality of selection regions; and store remaining data items of the compression data in the retention region.

In an embodiment of the present disclosure, an operating method of a storage device comprising volatile memory comprising a plurality of physical regions each comprising a plurality of storage space, the operating method may include: dividing the plurality of physical regions into first and second physical regions and assigning, to the second physical regions, a plurality of selection regions based on an N reference storage space size in accordance with each of a plurality of write data; generating compression data by compressing management request data, among the plurality of write data, wherein a compression size of the compression data is determined based on properties of the management request data; setting, as a retention region, M regions determined based on a difference between the compression size and the reference storage space size, among the first physical regions, when the compression size is greater than the reference storage space size; generating logical information indicative of the retention region; storing multiple data items of the compression data and the logical information in a request selection region corresponding to the management request data, among the plurality of selection regions; and storing remaining data items of the compression data in the retention region.

In the present technology, when compression data generated by compressing write data are stored in the volatile memory, a method of storing the compression data may be adjusted based on the size of the compression data.

Accordingly, the size of a storage space that is used to store the compression data in the volatile memory can be minimized.

DETAILED DESCRIPTION

Figure 1A:
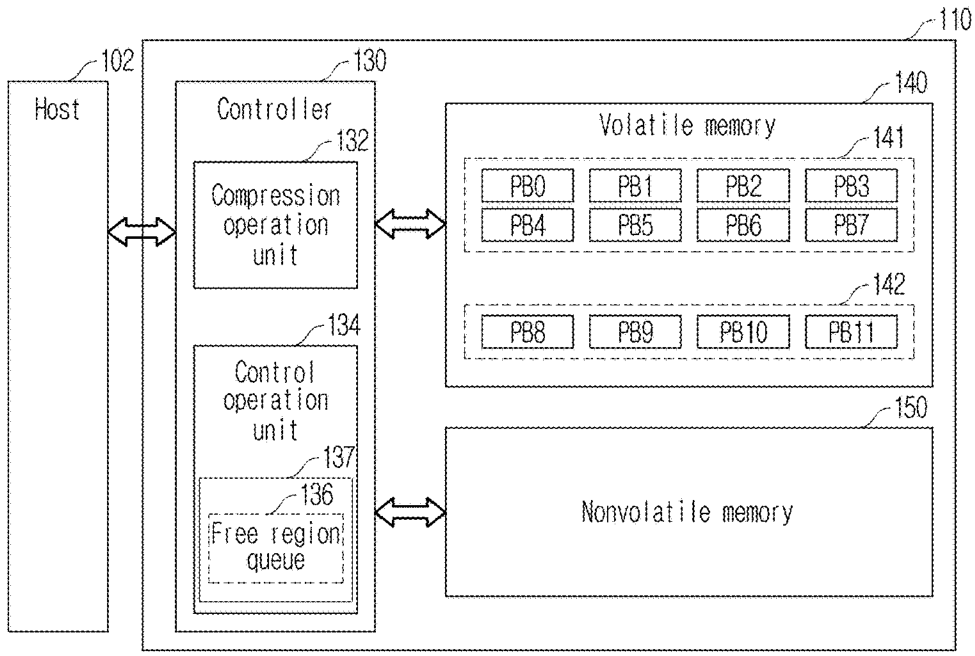
FIGS. 1A to 1C are diagrams for describing a data processing system including a storage device according to an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

Figure 1B:
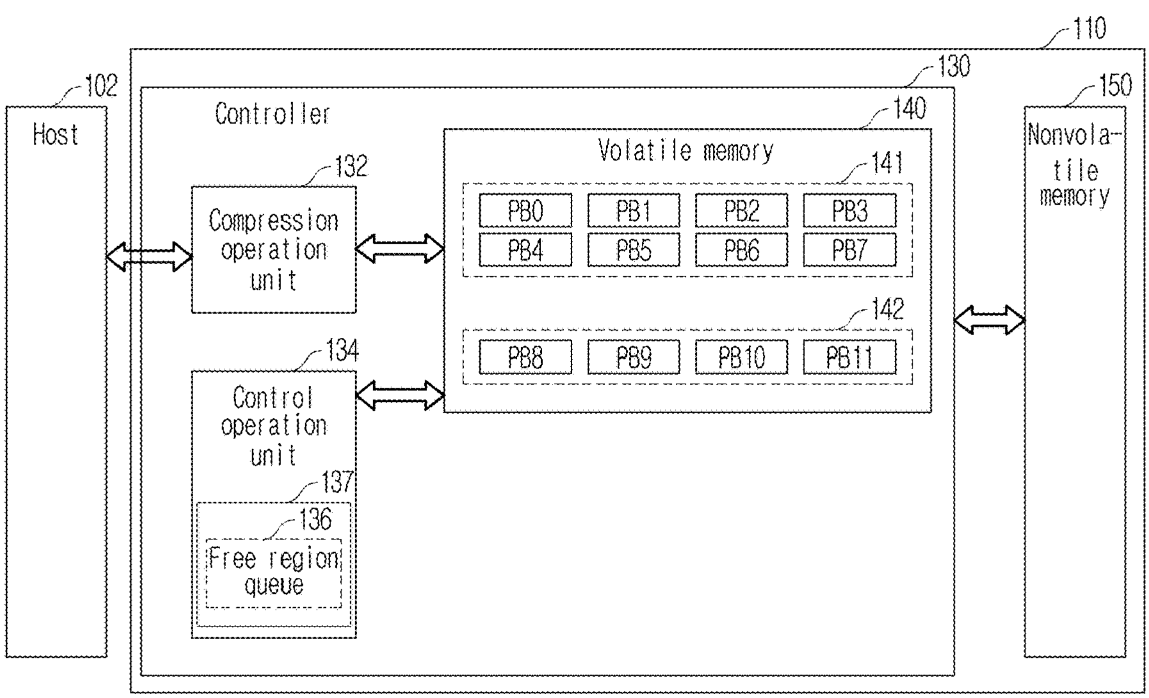
Figure 1C:
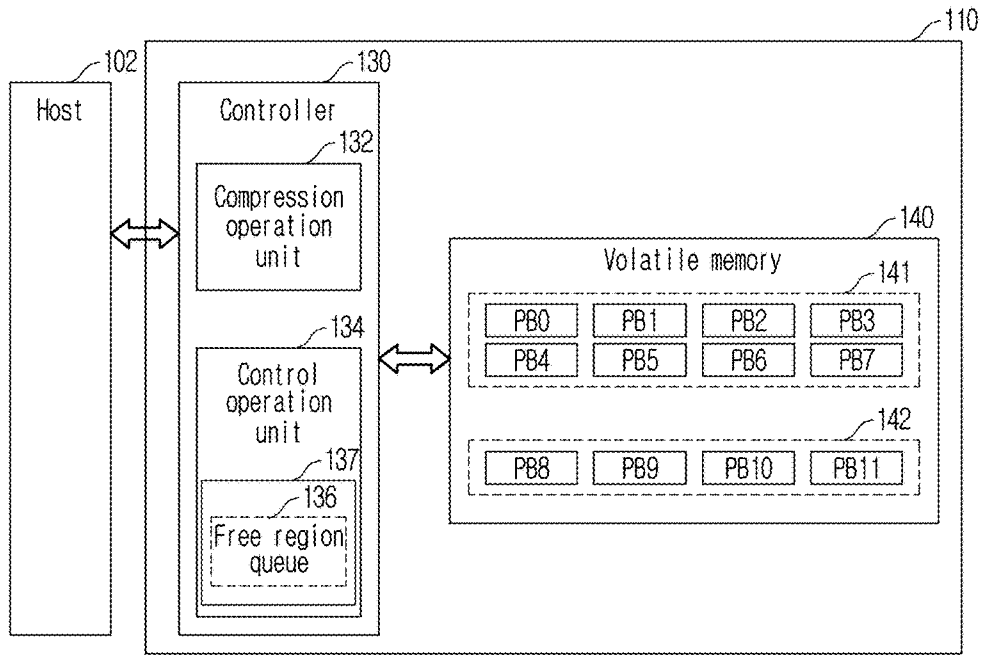

FIGS. 1A to 1C are diagrams for describing a data processing system including a storage device according to an embodiment of the present disclosure.

Referring to FIG. 1A, the data processing system may include a host 102 engaged or coupled with a memory system (i.e., the storage device 110). For example, the host 102 and the storage device 110 can be coupled to each other via a data bus, a host cable and the like to perform data communication.

The storage device 110 may include memory devices (i.e., volatile memories 140 and 150) and a controller 130. The memory devices 140, 150 and the controller 130 in the storage device 110 may be considered components or elements physically separated from each other. The memory devices 140, 150 and the controller 130 may be connected via at least one data path. For example, the data path may include a channel and/or a way.

According to an embodiment, the memory devices 140, 150 and the controller 130 may be components or elements functionally divided. Further, according to an embodiment, the memory devices 140, 150 and the controller 130 may be implemented with a single chip or a plurality of chips. The controller 130 may perform a data input and output (input/output) operation in response to a request input from the external device. For example, when the controller 130 performs a read operation in response to a read request input from an external device, data stored in a plurality of non-volatile memory cells included in the memory devices 140, 150 is transferred to the controller 130.

The controller 130 may control the memory devices 140 and 150 to perform read, program and erase operations corresponding to commands inputted from the host 102. The storage device 110 may independently perform the operations regardless of commands inputted from an external device such as the host 102.

Specifically, the memory devices 140 and 150 may include a volatile memory 140 and a nonvolatile memory 150.

The controller 130, the volatile memory 140, and the nonvolatile memory 150 may be physically separate components. The controller 130 and each of the volatile memory 140 and the nonvolatile memory 150 may be connected through at least one data path. For example, the data path may include channels and/or ways.

The controller 130 may be independently connected to each of the volatile memory 140 and the nonvolatile memory 150. For example, a first data path may be connected between the volatile memory 140 and the controller 130, a second data path may be connected between the nonvolatile memory 150 and the controller 130, and the first data path and the second data path may be physically separate.

The storage device 110 may not only be configured in the form illustrated in FIG. 1A, but may also be configured in the forms illustrated in FIGS. 1B and 1C.

That is, as illustrated in FIG. 1B, the volatile memory 140 may be included inside the controller 130 and may be connected to other components 132 and 134 inside the controller 130 through a data bus. The nonvolatile memory 150 may be configured to be connected through at least one data path outside the controller 130.

As illustrated in FIG. 1C, the storage device 110 may not include the nonvolatile memory 150, but may include only the volatile memory 140. The volatile memory 140 may be connected to the controller 130 through a data path.

Referring to FIGS. 1A to 1C together, the storage device 110 may compress write data to generate compressed data, and manage the generated compressed data in the volatile memory 140. The operation in which the volatile memory 140 manages the compressed data may mean that only the volatile memory 140 performs an access operation for the compressed data in a state in which the compressed data is stored in the volatile memory 140.

According to an embodiment, the write data may be data requested to be written from the host 102 to the storage device 110.

According to another embodiment, the write data may be data generated inside the controller 130 for the operation of the storage device 110.

In particular, even when the storage device 110 includes both the volatile memory 140 and the nonvolatile memory 150 as illustrated in FIGS. 1A and 1B, the storage device 110 may manage the compression data by using the volatile memory 140.

According to an embodiment, the storage device 110 may store the compressed data only in the volatile memory 140 without moving the compressed data to the nonvolatile memory 150, and then perform an access operation on the compressed data.

According to another embodiment, the storage device 110 stores the compressed data in both the nonvolatile memory 150 and the volatile memory 140, but stores the compressed data in the nonvolatile memory 150 for backup purposes. An access operation on the compressed data may be performed through the volatile memory 140.

Referring again to FIGS. 1A to 1C, the volatile memory 140 included in the storage device 110 may include a plurality of physical areas PB<0:11>.

The controller 130 included in the storage device 110 may include a compression operation unit 132 and a control operation unit 134.

The control operation unit 134 may include an internal memory 137 including a space for storing a free region (area) queue 136. The internal memory 137 may have a relatively higher operating speed than the volatile memory 140. According to an embodiment, when the volatile memory 140 is DRAM, the internal memory 137 may be SRAM.

A first embodiment to be described below with reference to FIGS. 2A to 2I may be an embodiment corresponding to when the control operation unit 134 controls the operation of the volatile memory 140 without using the free area queue 136. A second embodiment to be described with reference to FIGS. 3A to 3K may be an embodiment corresponding to when the control operation unit 134 controls the operation of the volatile memory 140 using the free area queue 136.

Specifically, the compression operation unit 132 included in the controller 130 may generate compression data by compressing "request data", or "management request data" that is, any one write datum that has been requested to be managed in the volatile memory 140, among a plurality of write data.

In this case, each of the plurality of write data may mean uncompressed original data, for example, raw data. The compression data generated by compressing the request data, among the plurality of write data, may mean data generated by compressing the write data through various compression algorithms, such as LZ4, LZ4HC, zStd.

The compression operation unit 132 may determine a "compression size", that is, the size of the compressed data generated based on the properties of the request data selected as a compression target, among the plurality of write data. That is, the compression operation unit 132 may variously apply a compression ratio depending on what value the request data selected as the compression target, among the plurality of write data, has and which compression algorithm is used. Accordingly, the "compression size", that is, the size of the generated compression data may also vary.

According to an embodiment, when first write data, among the plurality of write data, are selected as request data, the compression operation unit 132 may generate first compression data by performing a compression operation on the request data at a first ratio.

According to another embodiment, when second write data having properties different from those of the first write data, among the plurality of write data, are selected as request data, the compression operation unit 132 may generate second compression data by performing a compression operation on the request data at a second ratio greater than the first ratio.

In this case, each of the plurality of write data has a set size. Accordingly, a compression size corresponding to the first compression data compressed at the first ratio that is relatively low may be greater than a compression size corresponding to the second compression data compressed at the second ratio that is relatively high.

For reference, in an embodiment of the present disclosure, it has been illustrated that the two types of compression data are generated by compressing the write data at the two types of ratios. This is merely one embodiment, and more types of compression data may be practically generated by compressing the write data at more types of ratios than the two types of ratios.

The control operation unit 134 included in the controller 130 may divide the plurality of physical regions PB<0:11> included in the volatile memory 140 into the plurality of first physical regions PB<0:7> 141 and the plurality of second physical regions PB<8:11> 142.

According to an embodiment, as illustrated in the drawings, the control operation unit 134 may divide the eight physical regions PB<0:7>, among the twelve physical regions PB<0:11> included in the volatile memory 140, as the plurality of first physical regions 141, and may divide the remaining four physical regions PB<8:11> as the plurality of second physical regions 142.

In an embodiment of the present disclosure, it has been exemplified that the twelve physical regions are included in the volatile memory 140, but this is merely one embodiment. A larger number of physical regions may be practically included in the volatile memory 140. Likewise, in an embodiment of the present disclosure, it has been exemplified that eight physical regions that are a 2/3 ratio, among the twelve physical regions included in the volatile memory 140, are divided as the plurality of first physical regions, and the remaining four physical regions that are a 1/3 ratio, among the twelve physical regions included in the volatile memory 140, are divided as the plurality of second physical regions, but this is merely one embodiment. The plurality of physical regions included in the volatile memory 140 may be practically divided into the plurality of first and second physical regions by applying various ratios to the plurality of physical regions.

Each of the plurality of physical regions PB<0:11> included in the volatile memory 140 may include a plurality of storage spaces. For example, each of the plurality of physical regions PB<0:11> includes four storage spaces. In this case, the "storage space" means a space in which data or information having a set size may be stored. For example, data or information having a 16-byte size is stored in one storage space and data or information having a 64-byte size is stored in one physical region.

The aforementioned examples are merely an embodiment for convenience of description. Each of the plurality of physical regions PB<0:11> may be practically set to include storage spaces the number of which is less than 4 or greater than 4. Likewise, one storage space may be practically set to store data or information having a size less than or greater than the 16-byte size.

The control operation unit 134 may assign a plurality of selection regions that is divided in a reference size unit to the plurality of second physical regions 142 in accordance with each of the plurality of write data. In this case, the reference size may be an N-storage space size. N may be a natural number equal to or greater than 1.

In one embodiment, each of the plurality of write data may be stored in the volatile memory 140 as a plurality of compression data through the compression operation unit 132. Accordingly, corresponding to each of the plurality of write data may have the same meaning as corresponding to each of the plurality of compression data. That is, the control operation unit 134 may assign the plurality of selection regions corresponding to the plurality of compression data, respectively, to the plurality of second physical regions 142.

As described above, the meaning that the control operation unit 134 assigns the plurality of selection regions corresponding to the plurality of write data, respectively, to the plurality of second physical regions 142 may mean that N storage spaces in which each of the plurality of write data may be dedicatedly stored area assigned to the plurality of second physical regions 142.

Accordingly, after each of the plurality of write data is compressed as each of the plurality of compression data and stored in each of the plurality of selection regions, when a read operation for each of the plurality of compression data is requested, the control operation unit 134 may perform a read operation on each of the plurality of selection regions that is assigned in accordance with each of the plurality of compression data in the state in which a separate addition operation (e.g., a search operation) has not been performed.

According to an embodiment, the control operation unit 134 may set the size of four storage spaces as a reference size. That is, the control operation unit 134 may assign, to the plurality of second physical regions 142, a plurality of selection regions divided in a four-storage space unit in accordance with each of the plurality of write data. That is, the control operation unit 134 may assign, to the plurality of second physical regions 142, a plurality of selection regions divided as one physical region unit in accordance with each of the plurality of write data. For example, the control operation unit 134 may assign the first physical region PB<8>, among the four physical regions PB<8:11> included in the plurality of second physical regions 142, in accordance with first compression data generated by compressing first write data, among the plurality of write data. Furthermore, the control operation unit 134 may assign the second physical region PB<9>, among the four physical regions PB<8:11> included in the plurality of second physical regions 142, in accordance with second compression data generated by compressing second write data, among the plurality of write data.

In such a case, after the start of a read request for the first compression data, the control operation unit 134 may perform a read operation on the first physical region PB<8>, among the four physical regions PB<8:11> included in the plurality of second physical regions 142, in the state in which a separate operation for searching information with regard to the first compression data has not been performed. Likewise, after the start of a read request for the second compression data, the control operation unit 134 may perform a read operation on the second physical region PB<9>, among the four physical regions PB<8:11> included in the plurality of second physical regions 142, in the state in which a separate operation for searching information with regard to the second compression data has not been performed.

For reference, in the aforementioned description, only an embodiment of a case in which the control operation unit 134 sets the size of four storage spaces, that is, one physical region size, as the reference size has been disclosed, but this is merely for convenience of description. The size of storage spaces different from the four storage spaces may be set as the reference size. Furthermore, hereinafter, a case in which the control operation unit 134 sets the size of four storage spaces, that is, one physical region size, as the reference size is assumed and described.

The control operation unit 134 may check whether the size of compression data generated by compressing request data selected as a compression target, among the plurality of write data, through the compression operation unit 132, that is, a compression size, is greater than the reference size.

In this case, when the compression size is greater than the reference size, the control operation unit 134 may set M regions, among the plurality of first physical regions 141, as a retention region. M may be a natural number greater than or equal to 1. In this case, the control operation unit 134 may determine the value of M based on a difference between the compression size and the reference size. That is, the control operation unit 134 may determine the value of M based on the size of storage spaces corresponding to a difference between the compression size and the reference size.

For example, when a difference between the compression size and the reference size corresponds to the size of one to three storage spaces, M may be determined to be 1. In another example, when a difference between the compression size and the reference size corresponds to the size of four to six storage spaces, M may be determined to be 2. In still another example, when a difference between the compression size and the reference size corresponds to the size of seven to nine storage spaces, M may be determined to be 3.

After setting the retention region, the control operation unit 134 may generate logical information indicative of the retention region. That is, the control operation unit 134 may generate, as logical information, M physical values indicative of M physical regions set as a retention region, respectively.

After setting the retention region and generating the logical information, the control operation unit 134 may store some data items (or multiple data items) of the compression data and the logical information in a request selection region that belongs to a plurality of selection regions previously set in the plurality of second physical regions 142 and that corresponds to the request data, that is, the compression data. Next, the control operation unit 134 may store the remainder of the compression data except the some data items of the compression data stored in the request selection region, among the compression data, in the retention region.

The control operation unit 134 may generate number information set as the value M in accordance with M regions being set as the retention region because the compression size is greater than the reference size. Furthermore, the control operation unit 134 may store the number information set as the value M in the request selection region. That is, the control operation unit 134 may store the number information set as the value M in the request selection region along with the some of the compression data and the logical information.

According to an embodiment, compression data generated by compressing request data selected as a compression target, among the plurality of write data, through the compression operation unit 132 has a size corresponding to eight storage spaces.

In such a case, the control operation unit 134 may compare a compression size, that is, a size corresponding to the eight storage spaces, with the reference size, that is, the size corresponding to the four storage spaces, and may check that the compression size is greater than the reference size based on the results of the comparison. Furthermore, the control operation unit 134 may check that a difference between the compression size and the reference size corresponds to the size of four storage spaces, and thus may set two regions, among the plurality of first physical regions 141, as a retention region.

The control operation unit 134 may generate number information set as a value 2 in accordance with the two regions, among the plurality of first physical regions 141, being set as the retention region.

The control operation unit 134 may generate, as logical information, two logical values indicative of the two regions set as the retention region, respectively.

The control operation unit 134 may store the two logical values that are included in the logical information in two regions of the four storage spaces included in the request selection region corresponding to the compression data, among the plurality of second physical regions 142. Furthermore, the control operation unit 134 may store some data items of the compression data, that is, compression data that belong to the compression data corresponding to the size of eight storage spaces and that have a size corresponding to the two storage spaces, in the remaining two storage spaces except the two regions in which the two logical values included in the logical information, among the four storage spaces included in the request selection region, have been stored. In this case, the control operation unit 134 may store number information having a value 2 in the request selection region along with the logical information and some data items of the compression data.

The control operation unit 134 may store the remaining data of the compression data, that is, compression data having a size corresponding to the remaining six storage spaces except the compression data that have been stored in the request selection region and that have the size corresponding to the two storage spaces, among the compression data corresponding to the size of eight storage spaces, in the two regions set as the retention region.

When the compression size is less than or equal to the reference size, the control operation unit 134 might not set a retention region in the plurality of first physical regions 141, and thus might not generate logical information. The control operation unit 134 may store all of the compression data in the request selection region corresponding to the request data, that is, the compression data, among the plurality of selection regions that have been previously assigned to the plurality of second physical regions 142, in the state in which a retention region has not been set and logical information has not been generated as described above.

The control operation unit 134 may generate number information set as a value 0, in accordance with the compression size being the reference size or less.

According to an embodiment, compression data generated by compressing request data selected as a compression target, among the plurality of write data, through the compression operation unit 132 have a size corresponding to the four storage spaces.

In such a case, the control operation unit 134 may compare a compression size, that is, a size corresponding to the four storage spaces, with the reference size, that is, the size corresponding to the four storage spaces, and may check that the compression size is less than or equal to the reference size based on the results of the comparison. In this case, the control operation unit 134 may generate number information set as a value 0 in accordance with the compression size being the reference size or less.

Accordingly, the control operation unit 134 may store all of the compression data corresponding to the size of the four storage spaces in the four storage spaces included in the request selection region corresponding to the compression data, among the plurality of second physical regions 142, in the state in which a retention region has not been set and logical information has not been generated. In this case, the control operation unit 134 may store the number information having the value 0 in the request selection region along with all of the compression data.

In the aforementioned description, it may be seen that where the number information is stored in a space of the request selection region has not been described in detail. The reason for this is that the number information is information having a very small size, for example, a 1-byte size. That is, storing the number information in the request selection region may mean that the number information is stored in a separate meta region corresponding to the request selection region in the volatile memory 140.

After the start of a read operation for compression data for which read has been requested, among a plurality of compression data stored in the volatile memory 140, the control operation unit 134 may enter one of a first read mode and a second read mode based on number information stored in a request selection region in which the compression data for which read has been requested have been stored.

When number information stored in a request selection region in which compression data for which read has been requested have been stored has a value 0, the control operation unit 134 may sequentially read the compression data from the request selection region. That is, when the number information stored in the request selection region has the value 0, this may mean the state in which all of the compression data have been stored in the request selection region. Accordingly, the control operation unit 134 may confirm the number information having the value 0 and then sequentially read the compression data from the request selection region.

When number information stored in a request selection region in which compression data for which read has been requested have been stored has a value M, the control operation unit 134 may sequentially read the compression data from each of the request selection region and a retention region with reference to logical information stored in the request selection region. That is, when the number information stored in the request selection region has the value M, this may mean the state in which some compression data and the logical information including M physical values have been stored in the request selection region and the remaining compression data have been stored in the retention region including M regions indicated by the M physical values, among the plurality of first physical regions 141. Accordingly, the control operation unit 134 may confirm the number information having the value M, and may then sequentially read the compression data from each of the request selection region, among the plurality of second physical regions 142, and the M regions set as the retention region, among the plurality of first physical regions 141, with reference to the logical information stored in the request selection region.

The control operation unit 134 may set some of the number of free regions as a management region in order to store free region information of a free region in which data may be stored, among the plurality of first physical regions 141. Furthermore, the control operation unit 134 may check the number of free regions, among the plurality of first physical regions 141, and may change the number of regions set as the management region, among the number of free regions, based on the checked number of free regions. Accordingly, the control operation unit 134 may use the number of some free regions that are changed, among the number of free regions, in order to store free region information, and may set the number of remaining free regions except the number of some free regions that are changed, among the number of free regions, as retention regions in order to store the remainder of compression data (i.e., some data items of the compression data is stored in a request selection region).

According to an embodiment, all of the eight physical regions PB<0:7> divided as the plurality of first physical regions 141 are free regions. In such a case, the control operation unit 134 may set two regions, among the eight free regions, as a management region, and may store free region information of the remaining six free regions in two physical regions set as a management region.

According to another embodiment, it may be assumed that four physical regions, among the eight physical regions PB<0:7> divided as the plurality of first physical regions 141, are free regions. In such a case, the control operation unit 134 may set one of the four free regions as a management region and then store free region information of the three free regions in one physical region included in the management region.

The control operation unit 134 may manage the number of some physical regions set as a management region, among the plurality of first physical regions 141, in a connection list form.

According to an embodiment, assuming that two physical regions, among the plurality of first physical regions 141, are set as a management region, the control operation unit 134 may set, as a header, one of the two physical regions, which have been set as the management region, may set the other of the two physical regions as a tail, may set next information of the header so that the next information indicates the tail, and may set a value "null" indicating that a next region is not present in next information of the tail.

According to another embodiment, assuming that one physical region, among the plurality of first physical regions 141, is set as a management region, the control operation unit 134 may simultaneously set the one physical region set as the management region as a header and a tail, and may set a value "null" indicating that a next region is not present in the next information of the tail.

FIGS. 2A to 2I are diagrams for describing an operation of the storage device storing and managing compression data in internal volatile memory according to a first embodiment of the present disclosure.

Referring to FIGS. 2A to 2I, the control operation unit 134 may perform storing and managing compression data in the volatile memory 140 in the state in which the free region queue 136 has not been used.

For reference, it may be seen that only the volatile memory 140 included in the storage device 110 and the host 102, among the components of the data processing system illustrated in FIGS. 1A to 1C, have been illustrated in FIGS. 2A to 2I. That is, it may be seen that operations of the storage device 110, which are described with reference to FIGS. 2A to 2I, are based on the components of the storage device 110 described with reference to FIGS. 1A to 1C.

In FIGS. 2A to 2I, twelve physical regions PB<0:11> are included in the volatile memory 140. Eight physical regions PB<0:7>, among the twelve physical regions PB<0:11>, are divided as the plurality of first physical regions 141, and the remaining four physical regions PB<8:11> are divided as the plurality of second physical regions 142. Furthermore, four storage spaces are included in each of the twelve physical regions PB<0:11> included in the volatile memory 140. This is merely an embodiment for convenience of description, and the number of storage spaces may be practically set as a different number.

Figure 2A:
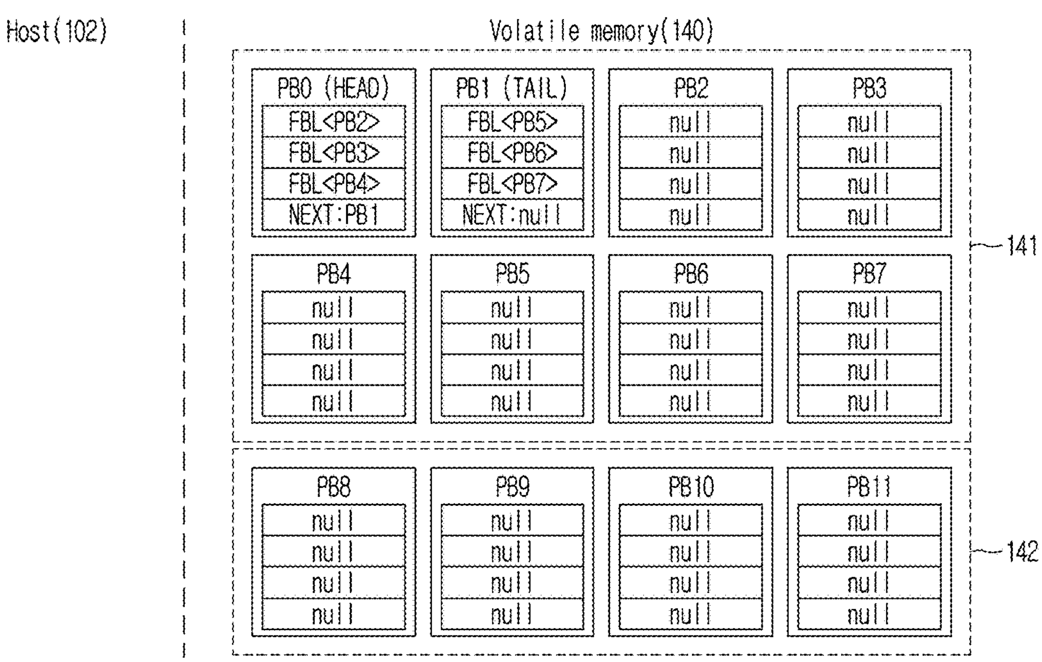
FIGS. 2A to 2I are diagrams for describing an operation of the storage device storing and managing compression data in internal volatile memory according to a first embodiment of the present disclosure.

Referring to FIG. 2A, it may be seen that the storage device 110 is in an initialization state. In this case, the initialization state of the storage device 110 may mean the state in which any compression data have not been stored in the volatile memory 140.

Specifically, the control operation unit 134 included in the controller 130 may divide the plurality of physical region PB<0:11> included in the volatile memory 140 into the plurality of first physical regions 141 and the plurality of second physical regions 142 in the initialization state.

The control operation unit 134 may check the number of free blocks, among the plurality of first physical regions 141. In this case, at timing prior to the state illustrated in FIG. 2A, that is, timing before the two physical regions PB<0:1> are set as a management region, all of the eight physical regions PB<0:7> included in the plurality of first physical regions 141 might have been free regions. Accordingly, the control operation unit 134 may check that the number of free blocks, among the plurality of first physical regions 141, is 8 through a method of sequentially checking whether each of the eight physical regions PB<0:7> divided as the plurality of first physical regions 141 is a free region.

The control operation unit 134 may set the number of some free regions, among the number of free regions checked among the plurality of first physical regions 141, as a management region.

According to an embodiment of FIG. 2A, the control operation unit 134 may check that the number of free blocks included in the plurality of first physical regions 141 is the eight physical regions PB<0:7> (i.e., checks that the number of free blocks is greater than 4 to 8 or less), and may then set the two regions PB<0:1>, among the eight free regions PB<0:7> included in the plurality of first physical regions 141, as a management region. As described above, the control operation unit 134 may set the two physical regions PB<0:1> as the management region, may generate free region information FBL<PB2:7> indicating that the remaining six physical regions PB<2:7> are free regions, and may store the free region information FBL<PB2:7> in the two physical regions PB<0:1> set as the management region.

In this case, the control operation unit 134 may manage the two physical regions PB<0:1> set as the management region in a connection list form. That is, the control operation unit 134 may set, as a header HEAD, a first management region PB0, that is, one of the two physical regions PB<0:1> set as the management region, may set, as a tail TAIL, a second management region PB1, that is, the other of the two physical regions PB<0:1> set as the management region, and may manage the two physical regions PB<0:1> in the connection list form.

The control operation unit 134 may store the free region information FBL<PB2:7> in every three storage spaces, among storage spaces four of which are included in each of the two physical regions PB<0:1> set as the management region, that is, a total of six storage spaces. Furthermore, the control operation unit 134 may store next information NEXT for managing a connection list in every one storage space, among the storage spaces four of which are included in each of the two physical regions PB<0:1> set as the management region, that is, a total of two storage spaces.

Specifically, the control operation unit 134 may divide six pieces of partial information FBL<PB2>, FBL<PB3>, FBL<PB4>, FBL<PB5>, FBL<PB6>, and FBL<PB7> included in the free region information FBL<PB2:7> into every three pieces of partial information FBL<PB2:4> and FBL<PB5:7>, and may store the every three pieces of partial information FBL<PB2:4> and FBL<PB5:7> in the two physical regions PB<0:1> set as the management region, respectively.

The control operation unit 134 may set, as the header HEAD, the second management region PB1 in next information NEXT of the first management region PB0 set, among the two physical regions PB<0:1> set as the management region, and may set, a the tail TAIL, a value "null" indicating that a next region is not present in next information NEXT of the second management region PB1.

Unlike the embodiment in FIG. 2A, the control operation unit 134 may check whether twelve free blocks are included in the plurality of first physical regions 141 (i.e., check whether the number of free blocks is greater than 8 to 12 or less). In such a case, the control operation unit 134 may set, as a management region, three regions, among the twelve free region included in the plurality of first physical regions 141. As described above, the control operation unit 134 may set the three physical regions as the management region, may generate free region information indicating that the remaining nine physical regions are free regions, and may store the free region information in the three physical regions set as the management region.

In this case, the control operation unit 134 may manage the three physical regions set as the management region in a connection list form. That is, the control operation unit 134 may set, as a header, one physical region, among the three physical regions set as the management region, may set, as a tail, one physical region, among the three physical regions set as the management region, and may set the remaining one physical region as a middle between the header and the tail.

The control operation unit 134 may store the free region information in every three storage spaces, among storage spaces four of which are included in each of the three physical regions set as the management region, that is, a total of nine storage spaces. Furthermore, the control operation unit 134 may store the next information NEXT for managing a connection list in every one storage space, among the storage spaces four of which are included in each of the three physical regions set as the management region, that is, a total of three storage spaces.

Specifically, the control operation unit 134 may divide the nine pieces of partial information included in the free region information into every three pieces of partial information, and may store the every three pieces of partial information in the three physical regions set as the management region, respectively.

The control operation unit 134 may set, as the header, the management region set as the middle in the next information of the management region set, among the three physical regions set as the management region, may set, as the middle, the management region set as the tail in the next information of the management region set, and may set, as the tail, a value "null" indicating that a next region is not present in the next information of the management region set.

The control operation unit 134 may assign a plurality of selection regions divided in a reference size unit to the plurality of second physical regions 142 in accordance with each of the plurality of write data. For example, the control operation unit 134 may assign a plurality of selection regions divided in a storage space size unit (i.e., 4 storage spaces) that is a reference size unit, that is, one physical region unit, to the plurality of second physical regions 142 in accordance with each of the plurality of write data. In this case, it has been exemplified that the four physical regions PB8, PB9, PB10, and PB11 are included in the plurality of second physical regions 142. Accordingly, each of the four physical regions PB8, PB9, PB10, and PB11 included in the plurality of second physical regions 142 may be divided as a selection region. That is, the control operation unit 134 may assign four selection regions divided in one physical region size unit to the plurality of second physical regions 142 in accordance with each of four write data.

For example, the first physical region PB8, among the four physical regions PB8, PB9, PB10, and PB11 included in the plurality of second physical regions 142, may be set and assigned as a first selection region in accordance with first write data, among the four write data. The second physical region PB9, among the four physical regions PB8, PB9, PB10, and PB11 included in the plurality of second physical regions 142, may be set and assigned as a second selection region in accordance with second write data, among the four write data. The third physical region PB10, among the four physical regions PB8, PB9, PB10, and PB11 included in the plurality of second physical regions 142, may be set and assigned as a third selection region in accordance with third write data, among the four write data. The fourth physical region PB11, among the four physical regions PB8, PB9, PB10, and PB11 included in the plurality of second physical regions 142, may be set and assigned as a fourth selection region in accordance with fourth write data, among the four write data.

Hereinafter, the four physical regions PB8, PB9, PB10, and PB11 included in the plurality of second physical regions 142 is described in a form corresponding to the four selection regions. For a clearer description, the same reference numerals are used in the four physical regions PB8, PB9, PB10, and PB11 and the four selection regions corresponding to the four physical regions PB8, PB9, PB10, and PB11. That is, the first selection region is described as reference numeral "PB8", the second selection region is described as reference numeral "PB9", the third selection region is described as reference numeral "PB10", and the fourth selection region is described as reference numeral "PB11".

Figure 2B:
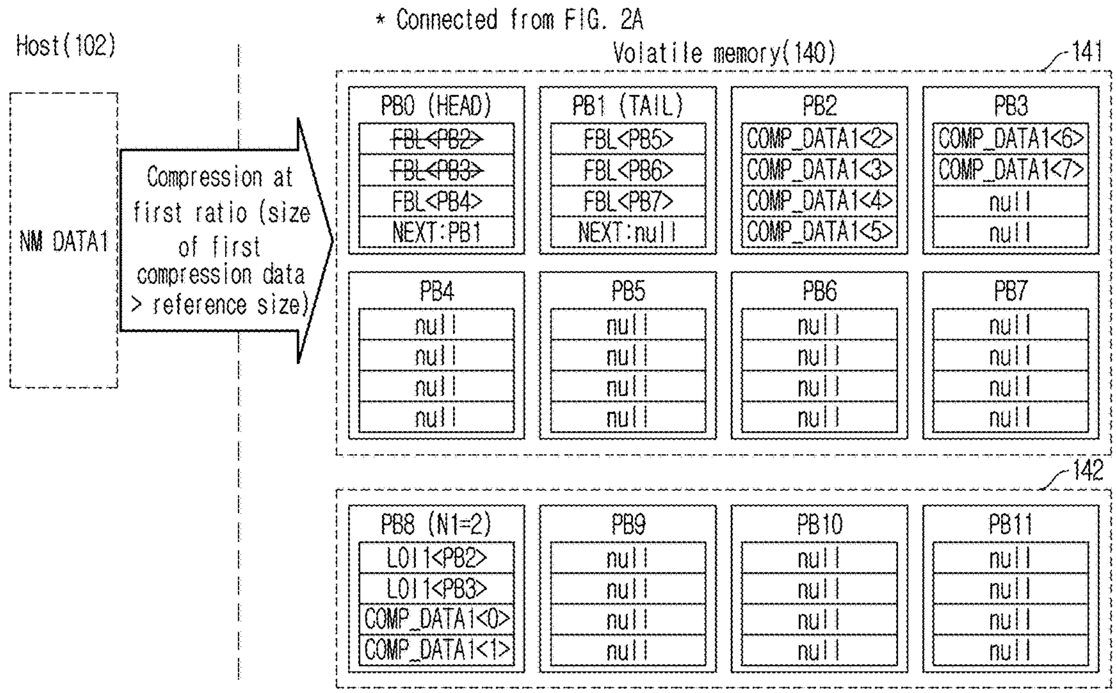

Referring to FIG. 2B, how the first write data NM_DATA1 generated by the host 102 are managed in the storage device 110 when the first write data NM_DATA1 are compressed at a first ratio after the initialization state of the storage device 110, which has been set in FIG. 2A, may be seen.

Specifically, the compression operation unit 132 included in the controller 130 may generate first compression data COMP_DATA1<0:7> by compressing the first write data NM_DATA1 transmitted by the host 102 at the first ratio. That is, the compression operation unit 132 may generate the first compression data COMP_DATA1<0:7> by compressing the first write data NM_DATA1 at the first ratio that is determined based on the properties of the first write data NM_DATA1, among a plurality of write data. The first compression data COMP_DATA1<0:7> that are generated by the compression operation unit 132 as described above may be divided into eight partial data COMP_DATA1<0>, COMP_DATA1<1>, COMP_DATA1<2>, COMP_DATA1<3>, COMP_DATA1<4>, COMP_DATA1<5>, COMP_DATA1<6>, and COMP_DATA1<7>. Accordingly, the size of the first compression data COMP_DATA1<0:7>, that is, a first compression size, may be the size of eight storage spaces.

The control operation unit 134 included in the controller 130 may compare the first compression size, that is, the size of eight storage spaces, and the reference size set as the size of four storage spaces, and may check whether the first compression size is greater than the reference size based on the results of the comparison.

The control operation unit 134 may check that a difference between the first compression size and the reference size corresponds to the size of four storage spaces. Accordingly, the control operation unit 134 may set the two physical regions PB<2:3>, among the plurality of first physical regions 141, as a first retention region.

The control operation unit 134 may generate first number information N1 set as a value 2, in accordance with the two physical regions PB<2:3>, among the plurality of first physical regions 141, being set as the first retention region.

The control operation unit 134 may generate, as first logical information, two logical values LOI1<PB2> and LOI1<PB3> indicative of the two physical regions PB<2:3> set as the first retention region.

After setting the first retention region and generating the first logical information, the control operation unit 134 may store the two logical values LOI1<PB2> and LOI1<PB3> included in the first logical information in two storage spaces, respectively, among the four storage spaces included in the first selection region PB8 that belongs to the four selection regions PB<8:11> previously assigned to the plurality of second physical regions 142 and that corresponds to the first write data NM_DATA1, that is, the first compression data COMP_DATA1<0:7>.

The control operation unit 134 may store some data items of the first compression data COMP_DATA1<0:7>, that is, the first and second data COMP_DATA1<0:1> of the first compression data COMP_DATA1<0:7>, in the remaining two storage spaces except the two storage spaces in which the first logical information has been stored, among the four storage spaces included in the first selection region PB8 corresponding to the first compression data COMP_DATA1<0:7>.

The control operation unit 134 may store the first number information N1 set as the value 2 in the first selection region PB8 (N1=1).

The control operation unit 134 may store the remaining data, that is, the third to eighth data COMP_DATA1<2:7> except the first and second data COMP_DATA1<0:1> stored in the first selection region PB8, among the first compression data COMP_DATA1<0:7>, in the two physical regions PB<2:3> set as the first retention region. That is, the control operation unit 134 may store the four data COMP_DATA1<2:5>, among the remaining data COMP_DATA1<2:7> of the first compression data COMP_DATA1<0:7>, in the four storage spaces included in the first region PB2, respectively, among the two physical regions PB<2:3> set as the first retention region. Furthermore, the control operation unit 134 may store the remaining two data COMP_DATA1<6:7> except the four data COMP_DATA1<2:5> stored in the first region PB2 set as the first retention region, among the remaining data COMP_DATA1<2:7> of the first compression data COMP_DATA1<0:7>, in the two storage spaces, respectively, among the four storage spaces included in the second region PB3 set as the first retention region.

After storing the remaining data COMP_DATA1<2:7> of the first compression data COMP_DATA1<0:7> in the first retention region, the control operation unit 134 may invalidate the information FBL<PB2:3> that belongs to the free region information and that corresponds to the first retention region in the management region. That is, the control operation unit 134 may invalidate the information FBL<PB2:3> that has been stored in the two storage spaces of the six storage spaces set to store the free region information and that corresponds to the first retention region, in the two physical regions PB<0:1> set as the management region. According to an embodiment, an operation of invalidating information stored in a storage space may be an operation of overwriting the value of a corresponding storage space with a specific value, for example, a value "null". According to another embodiment, an operation of invalidating information stored in a storage space may be an operation of setting the value of the storage space so that other data or information is subsequently overwritten, by indicating that the value of the storage space is invalidated.

Figure 2C:
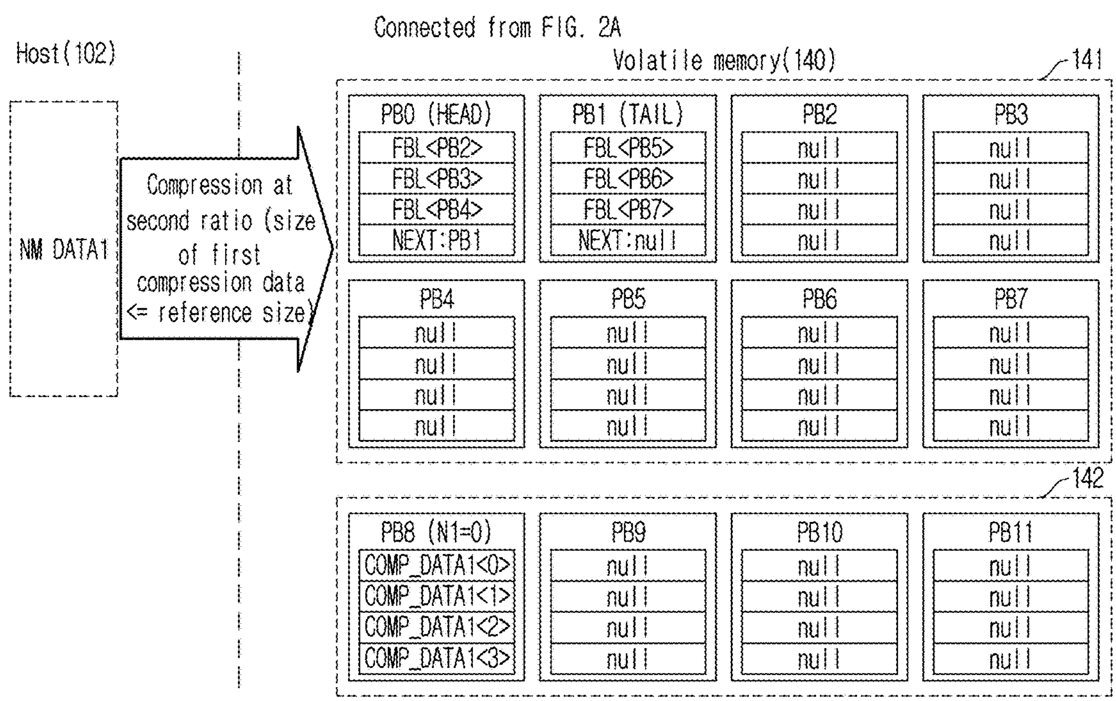

Referring to FIG. 2C, how the first write data NM_DATA1 generated by the host 102 are managed in the storage device 110 when the first write data NM_DATA1 are compressed at a second ratio after the initialization state of the storage device 110, which has been set in FIG. 2A, may be seen.

Specifically, the compression operation unit 132 included in the controller 130 may generate first compression data COMP_DATA1<0:3> by compressing the first write data NM_DATA1 transmitted by the host 102 at the second ratio. That is, the compression operation unit 132 may generate the first compression data COMP_DATA1<0:3> by compressing the first write data NM_DATA1 at the second ratio that is determined based on the properties of the first write data NM_DATA1, among a plurality of write data. The first compression data COMP_DATA1<0:3> generated by the compression operation unit 132 as described above may be divided into four partial data COMP_DATA1<0>, COMP_DATA1<1>, COMP_DATA1<2>, and COMP_ DATA1<3>. Accordingly, the size of the first compression data COMP_DATA1<0:3>, that is, a first compression size, may be the size of four storage spaces.

The control operation unit 134 included in the controller 130 may compare the first compression size, that is, the size of four storage spaces, with the reference size set as the size of four storage spaces, and may check that the first compression size is the same as the reference size based on the results of the comparison.

Accordingly, the control operation unit 134 might not set a first retention region, and thus might not generate first logical information. As described above, the control operation unit 134 may store all of the first compression data COMP_DATA1<0:3> in the four storage spaces included in the first selection region PB8 corresponding to the first write data NM_DATA1, that is, the first compression data COMP_DATA1<0:3>, among the four selection regions PB<8:11> that have been previously assigned to the plurality of second physical regions 142, in the state in which the first retention region has not been set and the first logical information has not been generated.

The control operation unit 134 may generate first number information N1 set as a value 0, in accordance with the first compression size being checked as being the same as the reference size.

The control operation unit 134 may store the first number information N1 set as the value 0 in the first selection region PB8 (N1=0).

Figure 2D:
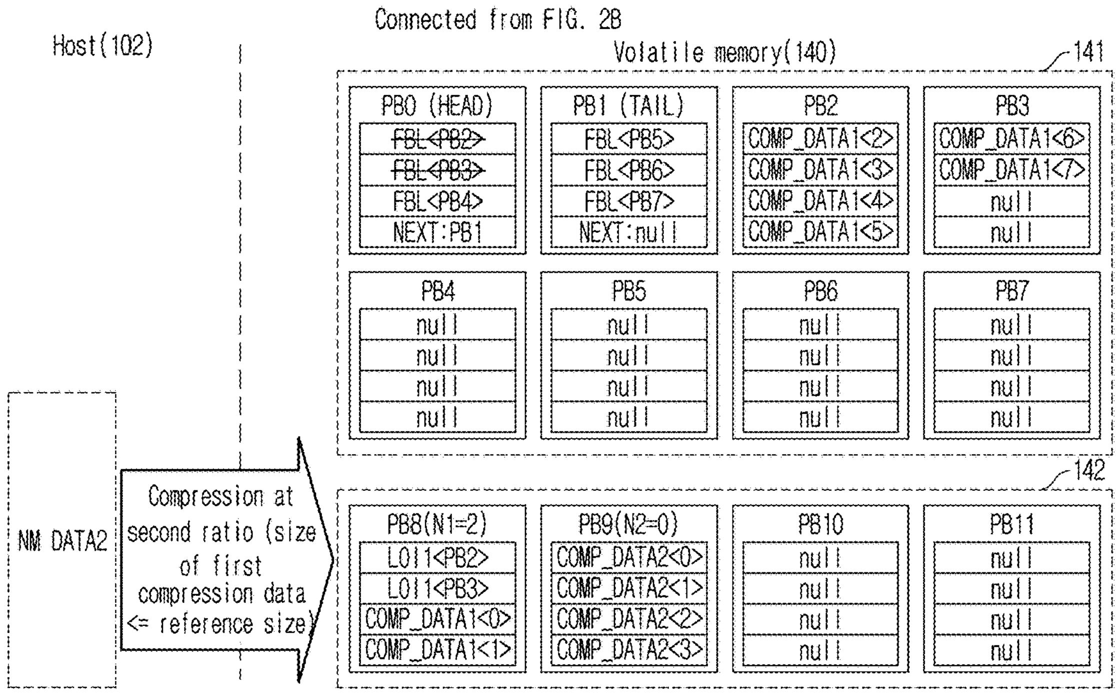

Referring to FIG. 2D, how second write data NM_DATA2 generated by the host 102 are managed in the storage device 110 when the second write data NM_DATA2 are compressed at a second ratio after the first write data NM_DATA1 generated by the host 102 are stored in the first retention region PB<2:3> of the volatile memory 140 as the first compression data COMP_DATA1<0:7> compressed at the first ratio in FIG. 2B may be seen.

Specifically, the compression operation unit 132 included in the controller 130 may generate second compression data COMP_DATA2<0:3> by compressing the second write data NM_DATA2 transmitted by the host 102 at the second ratio. That is, the compression operation unit 132 may generate the second compression data COMP_DATA2<0:3> by compressing the second write data NM_DATA2 at the second ratio that is determined based on the properties of the second write data NM_DATA2, among a plurality of write data (not illustrated). The second compression data COMP_DATA2<0:3> generated by the compression operation unit 132 as described above may be divided into four partial data COMP_DATA2<0>, COMP_DATA2<1>, COMP_DATA2<2>, and COMP_DATA2<3>. Accordingly, the size of the second compression data COMP_DATA2<0:3>, that is, a second compression size, may be the size of four storage spaces.

The control operation unit 134 included in the controller 130 may compare the second compression size, that is, the size of the four storage spaces, with the reference size set as the size of four storage spaces, and may check that the second compression size is the same as the reference size based on the results of the comparison.

Accordingly, the control operation unit 134 might not set a second retention region and thus might not generate second logical information. The control operation unit 134 may store all of the second compression data COMP_DATA2<0:3> in the four storage spaces included in the second selection region PB9 corresponding to the second write data NM_DATA2, that is, the second compression data COMP_DATA2<0:3>, among the four selection regions PB<8:11> that have been previously assigned to the plurality of second physical regions 142, in the state in which a second retention region has not been set and second logical information has not been generated as described above.

The control operation unit 134 may generate second number information N2 set as a value 0, in accordance with the second compression size being checked as being the same as the reference size.

The control operation unit 134 may store the second number information N2 set as the value 0 in the second selection region PB9 (N2=0).

Figure 2E:
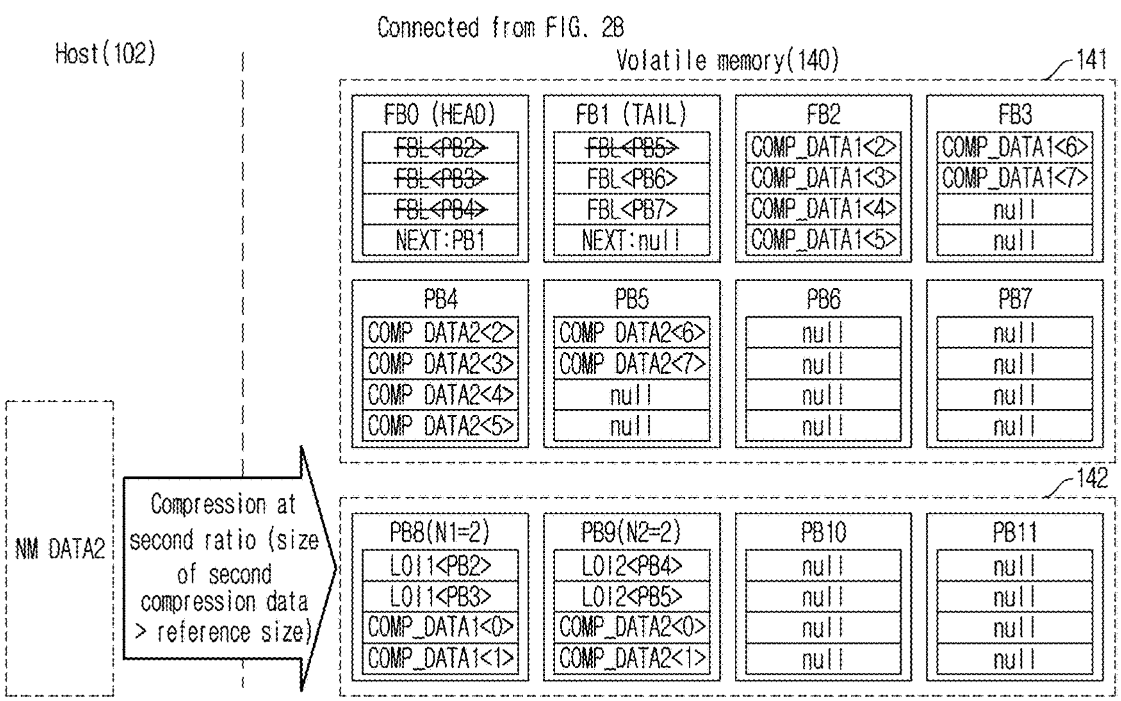

Referring to FIG. 2E, how the second write data NM_DATA2 generated by the host 102 are managed in the storage device 110 when the second write data NM_DATA2 are compressed at the first ratio after the first write data NM_DATA1 generated by the host 102 are stored in the first retention region PB<2:3> of the volatile memory 140 as the first compression data COMP_DATA1<0:7> compressed at the first ratio in FIG. 2B may be seen.

Specifically, the compression operation unit 132 included in the controller 130 may generate second compression data COMP_DATA2<0:7> by compressing the second write data NM_DATA2 transmitted by the host 102 at the first ratio. That is, the compression operation unit 132 may generate the second compression data COMP_DATA2<0:7> by compressing the second write data NM_DATA2 at the first ratio that is determined based on the properties of the second write data NM_DATA2, among a plurality of write data (not illustrated). The second compression data COMP_DATA2<0:7> generated by the compression operation unit 132 as described above may be divided into eight partial data COMP_DATA2<0>, COMP_DATA2<1>, COMP_DATA2<2>, COMP_DATA2<3>, COMP_DATA2<4>, COMP_DATA2<5>, COMP_DATA2<6>, and COMP_DATA2<7>. Accordingly, the size of the second compression data COMP_DATA2<0:7>, that is, a second compression size, may be the size of eight storage spaces.

The control operation unit 134 included in the controller 130 may compare the second compression size, that is, the size of the eight storage spaces, with the reference size set as the size of four storage spaces, and may check that the second compression size is greater than the reference size based on the results of the comparison.

The control operation unit 134 may check that a difference between the second compression size and the reference size corresponds to the size of four storage spaces. Accordingly, the control operation unit 134 may set two regions PB<4:5>, among the plurality of first physical regions 141, as a second retention region.

The control operation unit 134 may generate second number information N2 set as a value 2, in accordance with the two regions PB<4:5>, among the plurality of first physical regions 141, being set as the second retention region.

The control operation unit 134 may generate, as second logical information, two logical values LOI2<PB4> and LOI2<PB5> indicative of the two regions PB<4:5> set as the second retention region.

After setting the second retention region and generating the second logical information, the control operation unit 134 may store the two logical values LOI2<PB4> and LOI2<PB5> included in the second logical information in two storage spaces, respectively, among the four storage spaces included in the second selection region PB9 corresponding to the second write data NM_DATA2, that is, the second compression data COMP_DATA2<0:7>, among the four selection regions PB<8:11> that have been previously assigned to the plurality of second physical regions 142.

The control operation unit 134 may store some data items of the second compression data COMP_DATA2<0:7>, that is, the first and second data COMP_DATA2<0:1> of the second compression data COMP_DATA2<0:7>, in the remaining two storage spaces except the two storage spaces in which the second logical information has been stored, among the four storage spaces included in the second selection region PB9 corresponding to the second compression data COMP_DATA2<0:7>.

The control operation unit 134 may store the second number information N2 set as the value 2 in the second selection region PB9 (N1=1).

The control operation unit 134 may store the remaining data, that is, the third to eighth data COMP_DATA2<2:7>, except the first and second data COMP_DATA2<0:1> stored in the second selection region PB9, among the second compression data COMP_DATA2<0:7>, in the two regions PB<4:5> set as the second retention region. That is, the control operation unit 134 may store four data COMP_DATA2<2:5>, among the remaining data COMP_DATA2<2:7> of the second compression data COMP_DATA2<0:7>, in four storage spaces included in the first region PB4 of the two regions PB<4:5> set as the second retention region, respectively. Furthermore, the control operation unit 134 may store the remaining two data COMP_DATA2<6:7> except the four data COMP_DATA2<2:5> stored in the first region PB4 set as the second retention region, among the remaining data COMP_DATA2<2:7> of the second compression data COMP_DATA2<0:7>, in two storage spaces, respectively, among the four storage spaces included in the second region PB5 set as the second retention region.

After storing the remaining data COMP_DATA2<2:7> of the second compression data COMP_DATA2<0:7> in the second retention region, the control operation unit 134 may invalidate the information FBL<PB4:5> that belongs to the free region information and that corresponds to the second retention region in the management region. That is, the control operation unit 134 may invalidate the information FBL<PB4:5> that has been stored in the two storage spaces of the four storage spaces set in order to store the free region information and that corresponds to the second retention region, in the two physical regions PB<0:1> set as the management region. According to an embodiment, an operation of invalidating information stored in a storage space may be an operation of overwriting the value of a corresponding storage space with a specific value, for example, a value "null". According to another embodiment, an operation of invalidating information stored in a storage space may be an operation of setting the value of the storage space so that other data or information is subsequently overwritten, by indicating that the value of the storage space is invalidated.

Figure 2F:
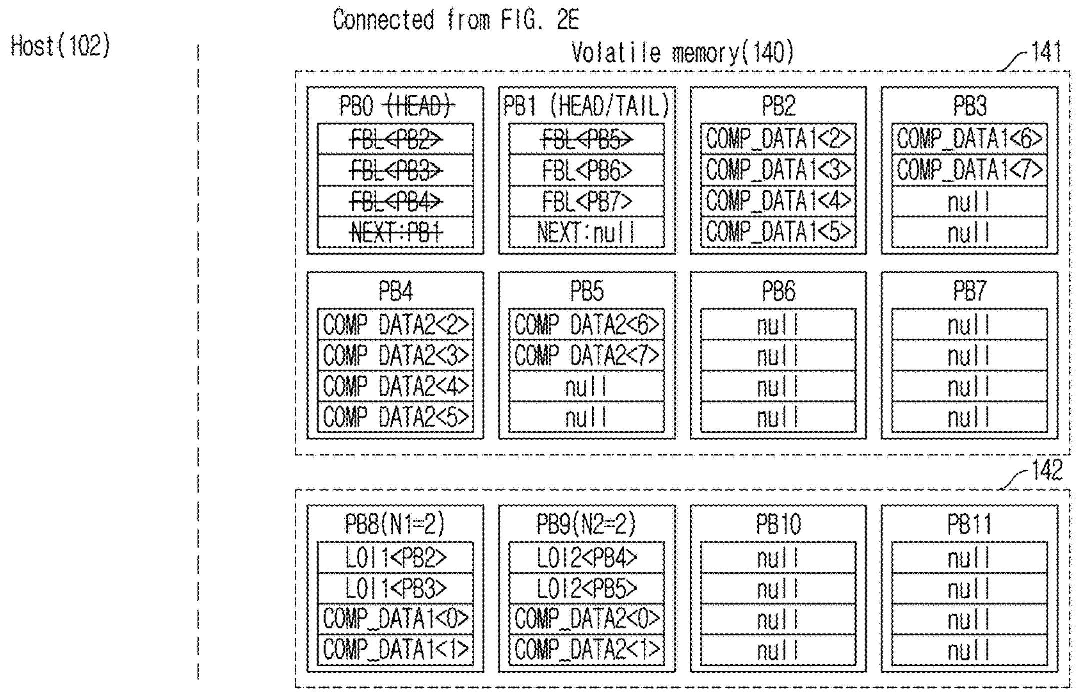
Figure 2G:
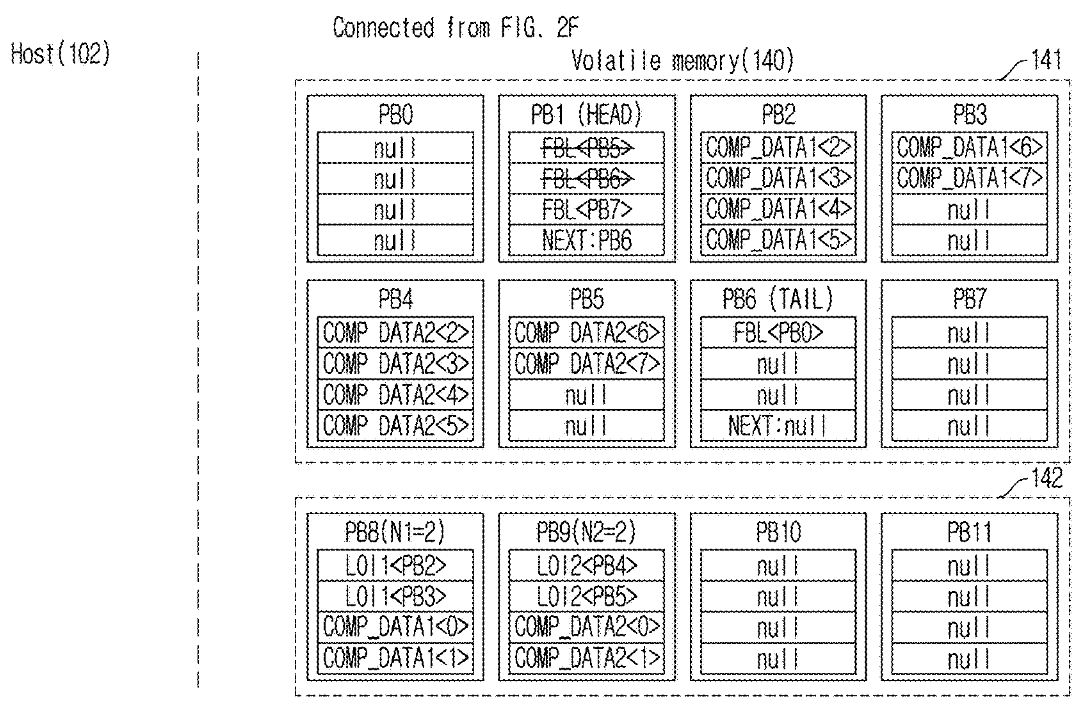

Referring to FIGS. 2F and 2G, how the two physical regions PB<0:1> set as the management region are managed after the first and second logical information LOI1<PB2:3> and LOI2<PB4:5> and the first and second compression data COMP_DATA1<0:7> and COMP_DATA2<0:7> are stored in the first and second selection regions PB<8:9> and first and second retention regions PB<2:5> of the volatile memory 140, respectively, in FIGS. 2B and 2E may be seen.

First, referring to FIG. 2F, after the first and second logical information LOI1<PB2:3> and LOI2<PB4:5> and first and second compression data COMP_DATA1<0:7> and COMP_DATA2<0:7> of the volatile memory 140 are stored in the first and second selection regions PB<8:9> and first and second retention regions PB<2:5> of the volatile memory 140, the information FBL<PB2:5> corresponding to the first and second retention regions might not be managed in the free region information by invalidating the information FBL<PB2:5> in the management region. This may mean the state in which all of the three pieces of information FBL<PB2:4> stored in the first management region PB0 set as the header HEAD, among the two physical regions PB<0:1> set as the management region, have been invalidated.

In such a case, the control operation unit 134 may set, as a new header HEAD, the second management region PB1 set in the next information NEXT of the first management region PB0 set as the header HEAD, that is, the physical region PB1 set as the tail TAIL in FIG. 2F. Accordingly, the second management region PB1 may be in the state in which the second management region PB1 has been simultaneously set as the header HEAD and the tail TAIL as the second management region PB1 already set as the tail TAI is set as the header HEAD as described above.

The control operation unit 134 may invalidate the next information NEXT of the first management region PB0 while simultaneously setting the second management region PB1 as the header HEAD and the tail TAIL. That is, the control operation unit 134 may invalidate all of data or information stored in the four storage regions included in the first management region PB0.

Referring to FIG. 2G, the control operation unit 134 may invalidate all of data or information stored in the four storage regions included in the first management region PB0, and may then include information FBL<PB0> corresponding to the first management region PB0 in the free region information by changing the first management region PB0 into a free region.

Specifically, after changing the first management region PB0 into the free region, the control operation unit 134 may check whether to include information FBL<PB0> corresponding to the first management region PB0 in the free region information by storing the information FBL<PB0> in a management region, that is, the second management region PB1 simultaneously set as the header HEAD and the tail TAIL.

As illustrated in FIG. 2G, when a free storage space is not present in the second management region PB1, the control operation unit 134 may confirm that the information FBL<PB0> corresponding to the new free region PB0 cannot be stored in the second management region PB1. Accordingly, the control operation unit 134 may include one free region PB6 in a management region as a third management region with reference to the free region information stored in the second management region PB1, and may manage the second management region PB1 and the third management region PB6 that have already been included in a connection list form. That is, the control operation unit 134 may include the information FBL<PB0> corresponding to the new free region PB0 in the free region information by storing the information FBL<PB0> in the third management region PB6 that is newly included in the management region, may then set the third management region PB6 in the next information NEXT of the second management region PB1, and may set a value "null" indicating that a next region is not present in the next information NEXT of the third management region PB6. Accordingly, the control operation unit 134 may set the second management region PB1 simultaneously set as the header HEAD and the tail TAIL only as the header HEAD, and may set the third management region PB6 that has been newly added as the tail TAIL.

The control operation unit 134 may invalidate the information FBL<PB6> that belongs to the free region information stored in the second management region PB1 and that corresponds to the third management region PB6 that has been newly included in a management region. That is, the control operation unit 134 may invalidate one piece of information (i.e., FBL<PB6>) that belongs to the free region information stored in the second management region PB1, and may include the information FBL<PB0>, which is generated by newly changing the management region into a free region, in the free region information by storing the information FBL<PB0> in the third management region PB5.

Unlike the operation in FIG. 2G, when a free storage space is present in the second management region PB1, the control operation unit 134 may include the information FBL<PB0> corresponding to the new free region PB0 in the free region information by storing the information FBL<PB0> in the free storage space of the second management region PB1. That is, the second management region PB1 may continue to maintain the state in which the second management region PB1 has been set as the header HEAD and the tail TAIL.

For reference, in FIG. 2G, the second management region PB1 may be simultaneously set as the header HEAD and the tail TAIL when the first management region PB0 set as the header HEAD is invalidated because it has been assumed that the two physical regions PB<0:1> are included in the management region. According to an embodiment, unlike the operation in FIG. 2G, when three or more physical regions are included in a management region, a physical region set as a header and a physical region set as a tail may be divided into different regions although the physical region set as the header is invalidated. According to another embodiment, unlike the operation in FIG. 2G, if only one physical region simultaneously set as a header and a tail is included in a management region, when the physical region is invalidated, one physical region that is left may be changed into a free region by not managing free region information by releasing the management region.

Figure 2H:
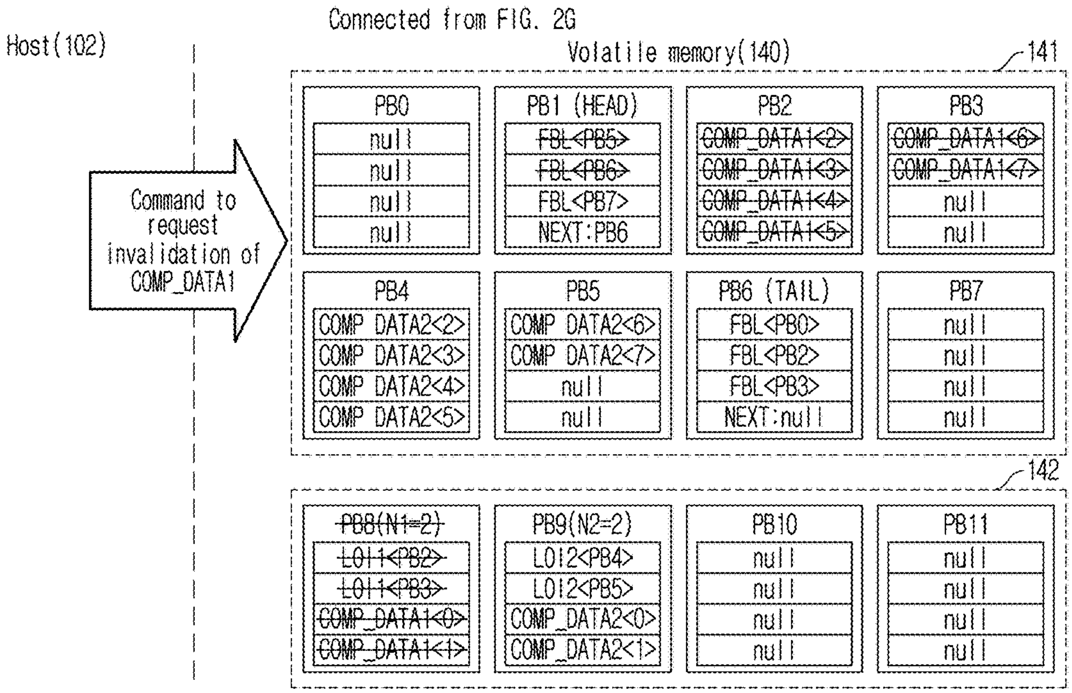

Referring to FIG. 2H, how the control operation unit 134 operates in response to a command to request the invalidation of the first compression data COMP_DATA1<0:7> after the state described with reference to FIG. 2G may be seen.

Specifically, the state described with reference to FIG. 2G may mean the state in which the first logical information LOI1<PB2:3> and the first compression data COMP_DATA1<0:7> have been stored in the first selection region PB8 and first retention region PB<2:3> of the volatile memory 140, respectively, the second logical information LOI2<PB4:5> and the second compression data COMP_DATA2<0:7> have been stored in the second selection region PB9 and second retention regions PB<4:5> of the volatile memory 140, respectively, and the two physical regions PB<1, 6> have been included in the management region.

In such a state, the host 102 may generate a command to request the invalidation of the first compression data COMP_DATA1<0:7> stored in the volatile memory 140, and may transmit the command to the control operation unit 134 of the controller 130. The control operation unit 134 may invalidate the first logical information LOI1<PB2:3> and the first compression data COMP_DATA1<0:7> that have been stored in the first selection region PB8 and the first retention region PB<2:3>, in response to the command to request the invalidation of the first compression data COMP_DATA1<0:7>.

After invalidating the first logical information LOI1<PB2:3> and the first compression data COMP_DATA1<0:7> in response to the command to request the invalidation of the first compression data COMP_DATA1<0:7>, the control operation unit 134 may change the first retention region PB<2:3> in which the remaining data COMP_DATA1<2:7> of the first compression data COMP_DATA1<0:7> has been stored into a free region, and may include the information FBL<PB2:3> corresponding to the first retention region PB<2:3> in the third management region PB6 set as a management region by storing the information FBL<PB2:3> in the free region information.

Figure 2I:
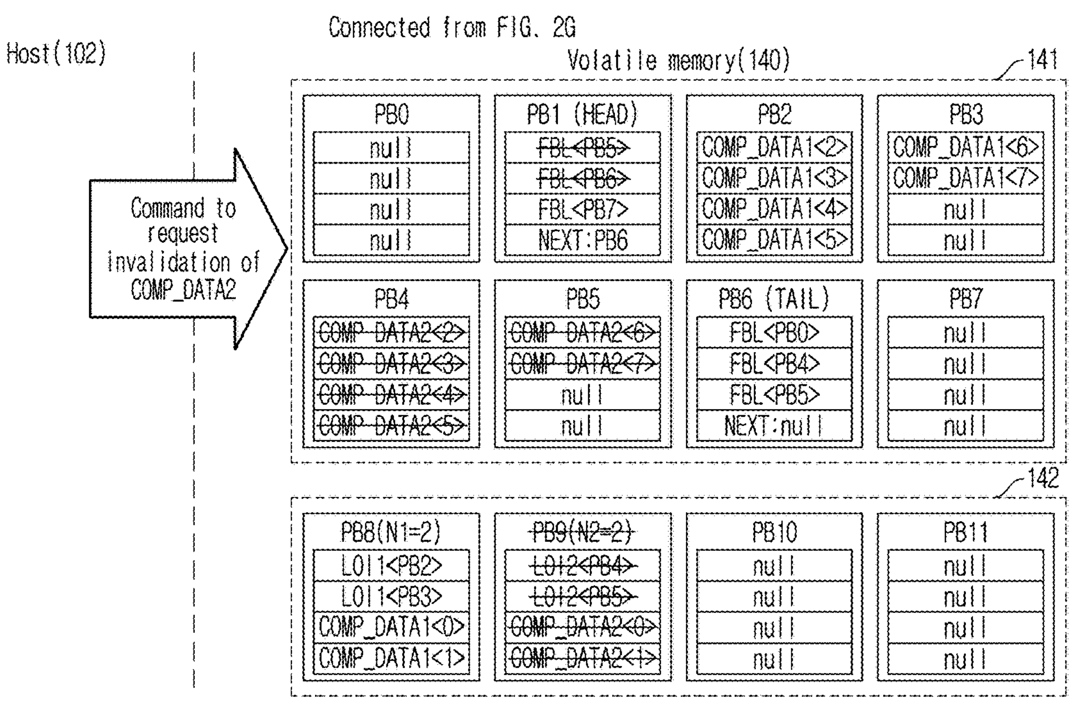

Referring to FIG. 2I, how the control operation unit 134 operates in response to a command to request the invalidation of the second compression data COMP_DATA2<0:7> after the state described with reference to FIG. 2G may be seen.

Specifically, the state described with reference to FIG. 2G may mean the state in which the first logical information LOI1<PB2:3> and the first compression data COMP_DATA1<0:7> have been stored in the first selection region PB8 and first retention region PB<2:3> of the volatile memory 140, respectively, the second logical information LOI2<PB4:5> and the second compression data COMP_DATA2<0:7> have been stored in the second selection region PB9 and second retention regions PB<4:5> of the volatile memory 140, respectively, and the two physical regions PB<1, 6> have been included in the management region.

In such a state, the host 102 may generate a command to request the invalidation of the second compression data COMP_DATA2<0:7> stored in the volatile memory 140, and may transmit the command to the control operation unit 134 of the controller 130. The control operation unit 134 may invalidate the second logical information LOI2<PB4:5> and the second compression data COMP_DATA2<0:7> stored in the second selection region PB9 and the second retention regions PB<4:5>, in response to the command to request the invalidation of the second compression data COMP_DATA2<0:7>.

After invalidating the second logical information LOI2<PB4:5> and the second compression data COMP_DATA2<0:7> in response to the command to request the invalidation of the second compression data COMP- _DATA2<0:7>, the control operation unit 134 may change the second retention regions PB<4:5> in which the second compression data COMP_DATA2<0:7> have been stored into a free region, and may include the information FBL<PB4:5> corresponding to the second retention regions PB<4:5> in the free region information by storing the information FBL<PB4:5> in the third management region PB6 set as a management region.

FIGS. 3A to 3K are diagrams for describing an operation of the storage device storing and managing compression data in internal volatile memory according to a second embodiment of the present disclosure.

Referring to FIGS. 3A to 3K, an operation of the control operation unit 134 storing and managing compression data in the volatile memory 140 in the state in which the control operation unit 134 uses the free region queue 136 may be described. In this case, the control operation unit 134 may use the free region queue 136 in the state in which the free region queue 136 has been stored in a region assigned in the internal memory 137. In particular, the internal memory 137 included in the control operation unit 134 may be memory having a relatively faster operating speed than the volatile memory 140. For example, if the volatile memory 140 is DRAM, the internal memory 137 included in the control operation unit 134 may be SRAM.

For reference, it may be seen that only the volatile memory 140 included in the storage device 110 and the host 102, among the components of the data processing system illustrated in FIGS. 1A to 1C, have been illustrated in FIGS. 3A to 3K. That is, it may be seen that operations of the storage device 110 described below with reference to FIGS. 3A to 3K are based on the components of the storage device 110 described with reference to FIGS. 1A to 1C.

In FIGS. 3A to 3K, the twelve physical regions PB<0:11> are included in the volatile memory 140, eight physical regions PB<0:7> among the twelve physical regions PB<0:11> are divided into the plurality of first physical regions 141, and the remaining four physical regions PB<8:11> are divided into the plurality of second physical regions 142. Furthermore, four storage spaces are included in each of the twelve physical regions PB<0:11> included in the volatile memory 140. Such assumption is merely an embodiment for convenience of description, and the number of storage spaces may be practically set as a different number.

Figure 3A:
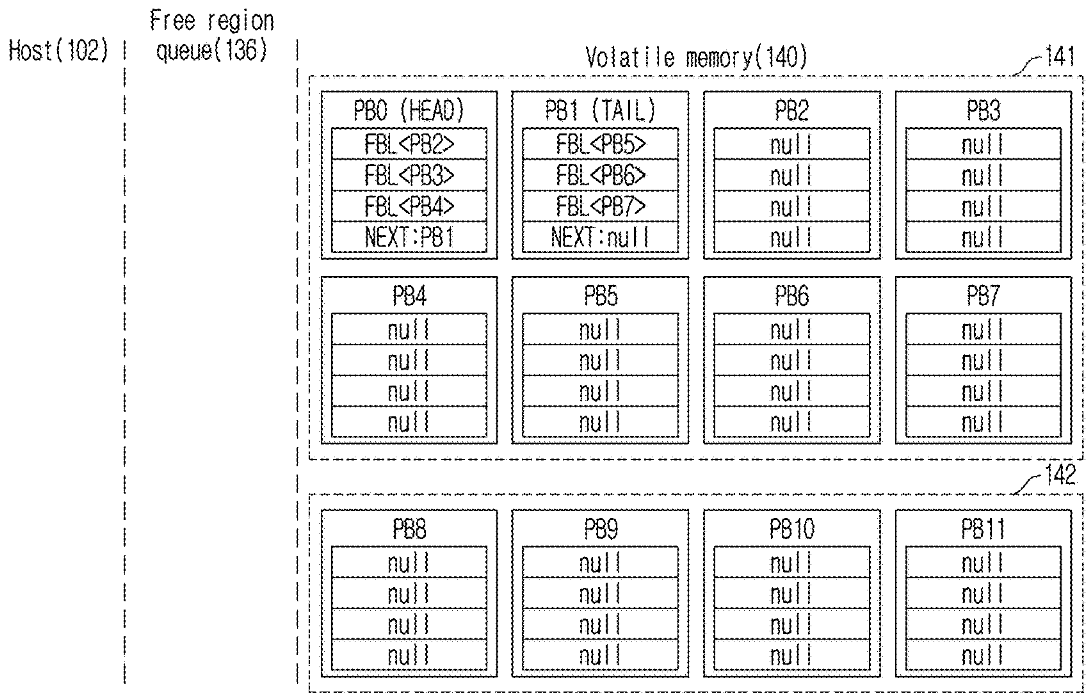
FIGS. 3A to 3K are diagrams for describing an operation of the storage device storing and managing compression data in internal volatile memory according to a second embodiment of the present disclosure.

Referring to FIG. 3A, the storage device 110 is in the initialization state. The initialization state of the storage device 110 may mean the state in which any compression data have not been stored in the volatile memory 140.

Specifically, the control operation unit 134 included in the controller 130 may divide the plurality of physical region PB<0:11> included in the volatile memory 140 into the plurality of first physical regions 141 and the plurality of second physical regions 142 in the initialization state.

The control operation unit 134 may check the number of free blocks, among the plurality of first physical regions 141. In this case, at timing prior to the state illustrated in the drawings, that is, timing before the two physical regions PB<0:1> are set as a management region, all of the eight physical regions PB<0:7> included in the plurality of first physical regions 141 might have been free regions. Accordingly, the control operation unit 134 may check the number of free blocks, among the plurality of first physical regions 141, is 8 through a method of sequentially checking whether each of the eight physical regions PB<0:7> divided as the plurality of first physical regions 141 is a free region.

The control operation unit 134 may set, as a management region, some free regions of the number of free regions that have been checked, among the plurality of first physical regions 141.

According to an embodiment, as in FIG. 3A, the control operation unit 134 may check that the number of free blocks included in the plurality of first physical regions 141 is the eight physical regions PB<0:7> (i.e., check that the number of free blocks is greater than 4 and less than or equal to 8), and may then set, as a management region, the two regions PB<0:1>, among the current eight free regions PB<0:7> included in the plurality of first physical regions 141. As described above, the control operation unit 134 may set the two physical regions PB<0:1> as the management region, may generate free region information FBL<PB2:7> indicating that the remaining six physical regions PB<2:7> are free regions, and may store the free region information FBL<PB2:7> in the two physical regions PB<0:1> set as the management region.

In this case, the control operation unit 134 may manage the two physical regions PB<0:1> set as the management region in a connection list form. That is, the control operation unit 134 may set, as a header HEAD, a first management region PB0, that is, one of the two physical regions PB<0:1> set as the management region, may set, as a tail TAIL, a second management region PB1, that is, the other of the two physical regions PB<0:1> set as the management region, and may manage the two physical regions PB<0:1> in the connection list form.

The control operation unit 134 may store the free region information FBL<PB2:7> in every three storage spaces, among storage spaces four of which are included in each of the two physical regions PB<0:1> set as the management region, that is, a total of six storage spaces. Furthermore, the control operation unit 134 may store next information NEXT for managing a connection list in every one storage space, among the storage spaces four of which are included in each of the two physical regions PB<0:1> set as the management region, that is, a total of two storage spaces.

Specifically, the control operation unit 134 may divide six pieces of partial information FBL<PB2>, FBL<PB3>, FBL<PB4>, FBL<PB5>, FBL<PB6>, and FBL<PB7> included in the free region information FBL<PB2:7> into every three pieces of partial information FBL<PB2:4> and FBL<PB5:7>, and may store the every three pieces of partial information FBL<PB2:4> and FBL<PB5:7> in the two physical regions PB<0:1> set as the management region, respectively.

The control operation unit 134 may set, as the header HEAD, the second management region PB1 in next information NEXT of the first management region PB0 set, among the two physical regions PB<0:1> set as the management region, and may set, as the tail TAIL, a value "null" indicating that a next region is not present in next information NEXT of the second management region PB1.

According to another embodiment, unlike the operation in FIG. 3A, the control operation unit 134 may check twelve free blocks are included in the plurality of first physical regions 141 (i.e., check that the number of free blocks is greater than 8 and less than or equal to 12). In such a case, the control operation unit 134 may set three regions, among the current twelve free region included in the plurality of first physical regions 141, as a management region. As described above, the control operation unit 134 may set the three physical regions as the management region, may generate free region information indicating that the remaining nine physical regions are free regions, and may store the free region information in the three physical regions set as the management region.

In this case, the control operation unit 134 may manage the three physical regions set as the management region in a connection list form. That is, the control operation unit 134 may set, as a header, one physical region, among the three physical regions set as the management region, may set, as a tail, one physical region, among the three physical regions set as the management region, and may set the remaining one physical region as a middle between the header and the tail.

The control operation unit 134 may store the free region information in every three storage spaces, among storage spaces four of which are included in each of the three physical regions set as the management region, that is, a total of nine storage spaces. Furthermore, the control operation unit 134 may store the next information NEXT for managing a connection list in every one storage space, among the storage spaces four of which are included in each of the three physical regions set as the management region, that is, a total of three storage spaces.

Specifically, the control operation unit 134 may divide the nine pieces of partial information included in the free region information into every three pieces of partial information, and may store the every three pieces of partial information in the three physical regions set as the management region, respectively.

The control operation unit 134 may set, as the header, the management region set as the middle in the next information of the management region set, among the three physical regions set as the management region, may set, as the middle, the management region set as the tail in the next information of the management region set, and may set, as the tail, a value "null" indicating that a next region is not present in the next information of the management region set.

The control operation unit 134 may assign a plurality of selection regions divided in a reference size unit to the plurality of second physical regions 142 in accordance with each of the plurality of write data. For example, the control operation unit 134 may assign a plurality of selection regions divided in a storage space size unit (i.e., four storage spaces) that is a reference size unit, that is, one physical region unit, to the plurality of second physical regions 142 in accordance with each of the plurality of write data. In this case, it has been exemplified that the four physical regions PB8, PB9, PB10, and PB11 are included in the plurality of second physical regions 142. Accordingly, each of the four physical regions PB8, PB9, PB10, and PB11 included in the plurality of second physical regions 142 may be divided as a selection region. That is, the control operation unit 134 may assign four selection regions divided in one physical region size unit to the plurality of second physical regions 142 in accordance with each of four write data.

For example, the first physical region PB8, among the four physical regions PB8, PB9, PB10, and PB11 included in the plurality of second physical regions 142, may be set and assigned as a first selection region in accordance with first write data, among the four write data. Furthermore, the second physical region PB9, among the four physical regions PB8, PB9, PB10, and PB11 included in the plurality of second physical regions 142, may be set and assigned as a second selection region in accordance with second write data, among the four write data. Furthermore, the third physical region PB10, among the four physical regions PB8, PB9, PB10, and PB11 included in the plurality of second physical regions 142, may be set and assigned as a third selection region in accordance with third write data, among the four write data. Furthermore, the fourth physical region PB11, among the four physical regions PB8, PB9, PB10, and PB11 included in the plurality of second physical regions 142, may be set and assigned as a fourth selection region in accordance with fourth write data, among the four write data.

Hereinafter, the four physical regions PB8, PB9, PB10, and PB11 included in the plurality of second physical regions 142 is described in a form corresponding to the four selection regions. For a clearer description, the same reference numerals are used in the four physical regions PB8, PB9, PB10, and PB11 and the four selection regions corresponding to the four physical regions PB8, PB9, PB10, and PB11. That is, hereinafter, the first selection region is described as reference numeral "PB8", the second selection region is described as reference numeral "PB9", the third selection region is described as reference numeral "PB10", and the fourth selection region is described as reference numeral "PB11".

Figure 3B:
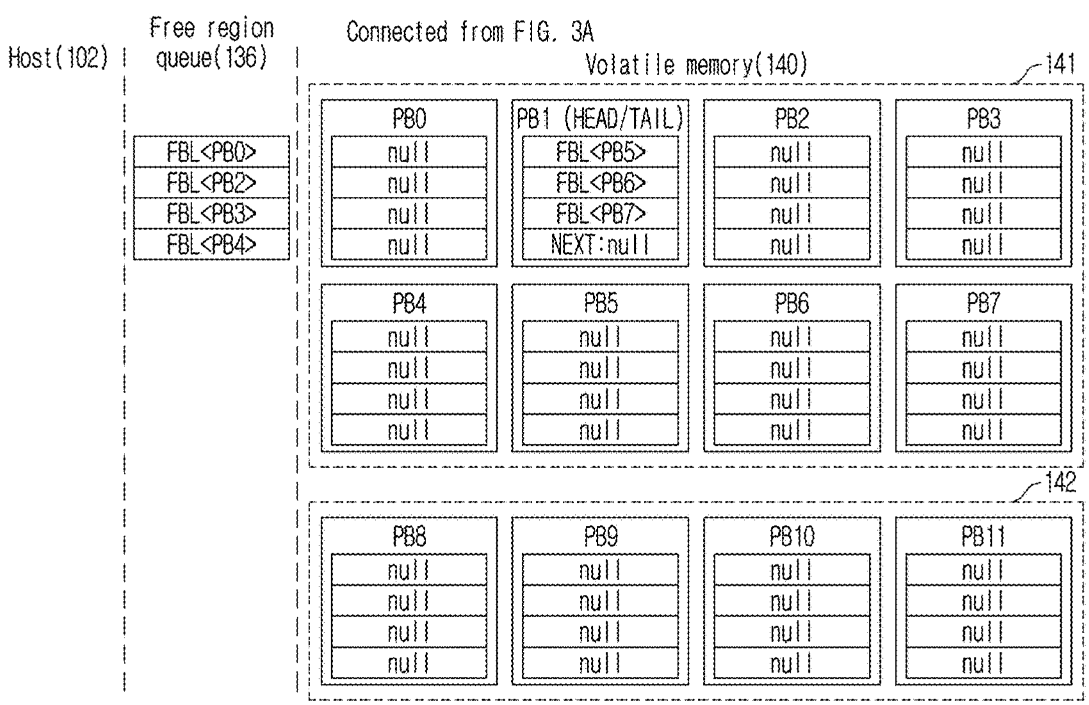

Referring to FIG. 3B, it may be seen that after the free region information is stored in the management region of the volatile memory 140 in FIG. 3A, some information items (entries, pieces) of the free region information may be managed in the free region queue 136 assigned to the internal memory 137 by moving the some information items of the free region information to the free region queue 136.

Specifically, the control operation unit 134 may select some information items of the free region information managed in the management region of the volatile memory 140, and may move the some information items to the free region queue 136 assigned to the internal memory 137.

After moving the some information items of the free region information managed in the management region of the volatile memory 140 to the free region queue 136 assigned to the internal memory 137, the control operation unit 134 may change one physical region in which the some information items of the free region information has been stored, among the plurality of first physical regions 141 set as the management region, into a free region, may move information with regard to the changed free region to the free region queue 136, and may manage the information.

According to an embodiment, as illustrated in FIG. 3B, the control operation unit 134 may move some information items FBL<PB2:4> of the free region information stored in the first management region PB0 set as a header HEAD, among the two physical regions PB<0:1> set as the management region, to the free region queue 136, and may move the some information items FBL<PB2:4>. In this case, the control operation unit 134 may set, as a new header HEAD, the second management region PB1 set in the next information NEXT of the first management region PB0 set as the header HEAD in the management region, that is, the physical region PB1 set as the tail TAIL in FIG. 3B. The second management region PB1 may be in the state in which the second management region PB1 has been simultaneously set as the header HEAD and the tail TAIL as the second management region PB1 already set as the tail TAIL is set as the header HEAD as described above. After moving the some information items FBL<PB2:4> of the free region information stored in the first management region PB0 to the free region queue 136, the control operation unit 134 may change the first management region PB0 into a free region, may move the information FBL<PB0> of the region PB0 that has been changed into the free region to the free region queue 136, and may manage the information FBL<PB0> along with the some information items FBL<PB2:4>.

Figure 3C:
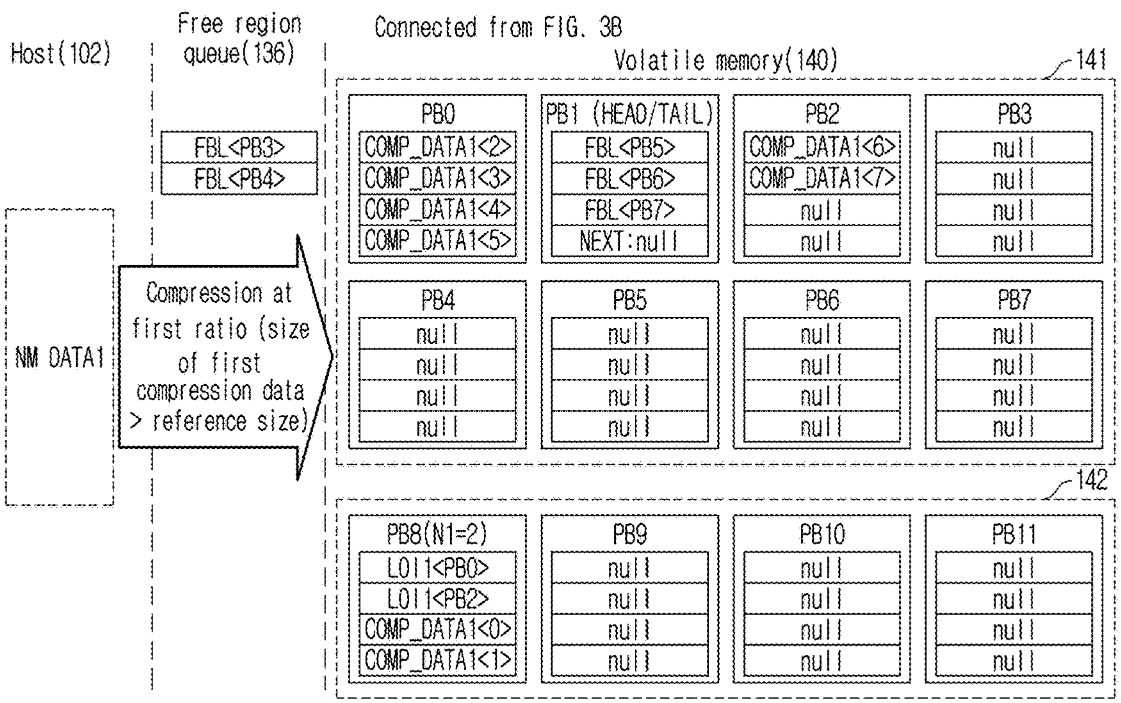

Referring to FIG. 3C, how first write data NM_DATA1 generated by the host 102 are managed in the storage device 110 when the first write data NM_DATA1 are compressed at a first ratio after the state described with reference to FIG. 3B may be seen.

Specifically, the compression operation unit 132 included in the controller 130 may generate first compression data COMP_DATA1<0:7> by compressing the first write data NM_DATA1 transmitted by the host 102 at the first ratio. That is, the compression operation unit 132 may generate the first compression data COMP_DATA1<0:7> by compressing the first write data NM_DATA1 at the first ratio that is determined based on the properties of the first write data NM_DATA1, among a plurality of write data. The first compression data COMP_DATA1<0:7> generated by the compression operation unit 132 as described above may be di vided into eight partial data COMP_DATA1<0>, COMP_DATA1<1>, COMP_DATA1<2>, COMP_DATA1<3>, COMP_DATA1<4>, COMP_DATA1<5>, COMP_DATA1<6>, and COMP_DATA1<7>. Accordingly, the size of the first compression data COMP_DATA1<0:7>, that is, a first compression size, may be the size of eight storage spaces.

The control operation unit 134 included in the controller 130 may compare the first compression size, that is, the size of eight storage spaces, with a reference size set as the size of four storage spaces, and may check that the first compression size is greater than the reference size based on the results of the comparison.

The control operation unit 134 may check that a difference between the first compression size and the reference size corresponds to the size of four storage spaces. Accordingly, the control operation unit 134 may set two regions PB<0, 2>, among the plurality of first physical regions 141, as a first retention region.

The control operation unit 134 may generate first number information N1 set as a value 2, in accordance with the two regions PB<0, 2>, among the plurality of first physical regions 141, being set as the first retention region.

The control operation unit 134 may generate, as first logical information, two logical values LOI1<PB0> and LOI1<PB2> indicative of the two regions PB<0, 2> set as the first retention region.

After setting the first retention region and generating the first logical information, the control operation unit 134 may store the two logical values LOI1<PB0> and LOI1<PB2> included in the first logical information in two storage spaces, respectively, among the four storage spaces included in a first selection region PB8 corresponding to the first write data NM_DATA1, that is, the first compression data COMP_DATA1<0:7>, among the four selection regions PB<8:11> previously assigned to the plurality of second physical regions 142.

The control operation unit 134 may store some data items of the first compression data COMP_DATA1<0:7>, that is, the first and second data COMP_DATA1<0:1> of the first compression data COMP_DATA1<0:7>, in the remaining two storage spaces except the two storage spaces in which the first logical information has been stored, among the four storage spaces included in the first selection region PB8 corresponding to the first compression data COMP_DATA1<0:7>.

The control operation unit 134 may store the first number information N1 set as the value 2 in the first selection region PB8 (N1=1).

The control operation unit 134 may store the remaining data except the some data items COMP_DATA1<0:1> stored in the first selection region PB8, among the first compression data COMP_DATA1<0:7>, that is, the third to eighth data COMP_DATA1<2:7> in the two regions PB<0, 2> set as the first retention region. That is, the control operation unit 134 may store four data COMP_DATA1<2:5>, among the remaining data COMP_DATA1<2:7> of the first compression data COMP_DATA1<0:7>, in the four storage spaces included in the first region PB0, respectively, among the two regions PB<0, 2> set as the first retention region. Furthermore, the control operation unit 134 may store the remaining two data COMP_DATA1<6:7> except the four data COMP_DATA1<2:5> stored in the first region PB0 of the first retention region, among the remaining data COMP_DATA1<2:7> of the first compression data COMP_DATA1<0:7>, in the two storage spaces of the four storage spaces included in the second region PB2 of the first retention region.

After storing the remaining data COMP_DATA1<2:7> of the first compression data COMP_DATA1<0:7> in the first retention region, the control operation unit 134 may invalidate information FBL<PB0, 2> that belongs to the free region information and that corresponds to the first retention region in the free region queue 136 and the management region. That is, the control operation unit 134 may invalidate the information FBL<PB0, 2> that belongs to the free region information managed in the free region queue 136 and the management region and that corresponds to the first retention region. According to an embodiment, as illustrated in FIG. 3C, in the case of the state in which the information FBL<PB0, 2> corresponding to the first retention region has been stored in the free region queue 136, the control operation unit 134 may invalidate the information FBL<PB0, 2> by deleting the information FBL<PB0, 2> from the free region queue 136. According to another embodiment, unlike illustrated in FIG. 3C, if information corresponding to the first retention region has been stored in a storage space included in the management region of the volatile memory 140, an operation of invalidating the information stored in the storage space may be an operation of overwriting the value of the storage space with a specific value, for example, a value "null" or setting the value of the storage space so that other data or information is subsequently overwritten by indicating that the value of the storage space is invalidated.

Figure 3D:
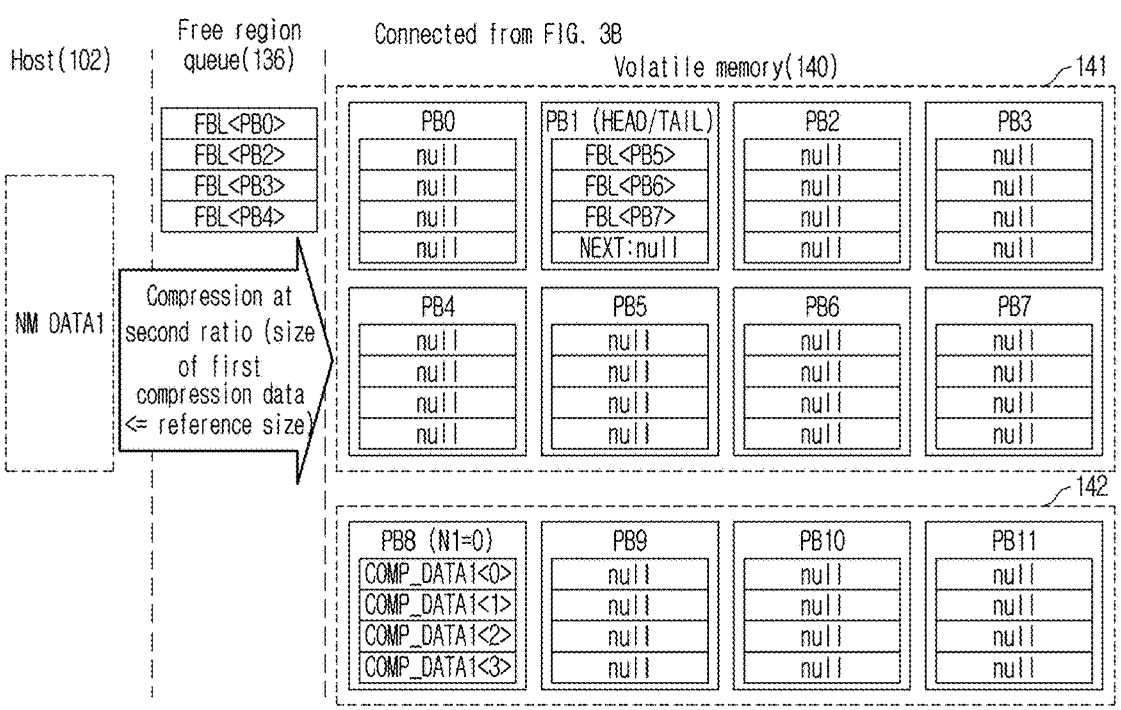

Referring to FIG. 3D, how the first write data NM_DATA1 generated by the host 102 are managed in the storage device 110 when the first write data NM_DATA1 are compressed at a second ratio after the state described with reference to FIG. 3B may be seen.

Specifically, the compression operation unit 132 included in the controller 130 may generate first compression data COMP_DATA1<0:3> by compressing the first write data NM_DATA1 transmitted by the host 102 at the second ratio. That is, the compression operation unit 132 may generate the first compression data COMP_DATA1<0:3> by compressing the first write data NM_DATA1 at the second ratio that is determined based on the properties of the first write data NM_DATA1, among a plurality of write data. The first compression data COMP_DATA1<0:3> generated by the compression operation unit 132 as described above may be divided into four partial data COMP_DATA1<0>, COMP_DATA1<1>, COMP_DATA1<2>, and COMP_DATA1<3>. Accordingly, the size of the first compression data COMP_DATA1<0:3>, that is, a first compression size, may be the size of four storage spaces.

The control operation unit 134 included in the controller 130 may compare the first compression size, that is, the size of four storage spaces, with a reference size set as the size of four storage spaces, and may check that the first compression size is the same as the reference size based on the results of the comparison.

Accordingly, the control operation unit 134 might not set a first retention region, and might not generate first logical information. In the state in which the first retention region has not been set and the first logical information has not been generated as described above, the control operation unit 134 may store all of the first compression data COMP_DATA1<0:3> in four storage spaces included in the first selection region PB8 corresponding to the first write data NM_DATA1, that is, the first compression data COMP_DATA1<0:3>, among the four selection regions PB<8:11> previously assigned to the plurality of second physical regions 142.

The control operation unit 134 may generate first number information N1 set as a value 0, in accordance with the first compression size being checked as being the same as the reference size.

The control operation unit 134 may store the first number information N1 set as the value 0 in the first selection region PB8 (N1=0).

Figure 3E:
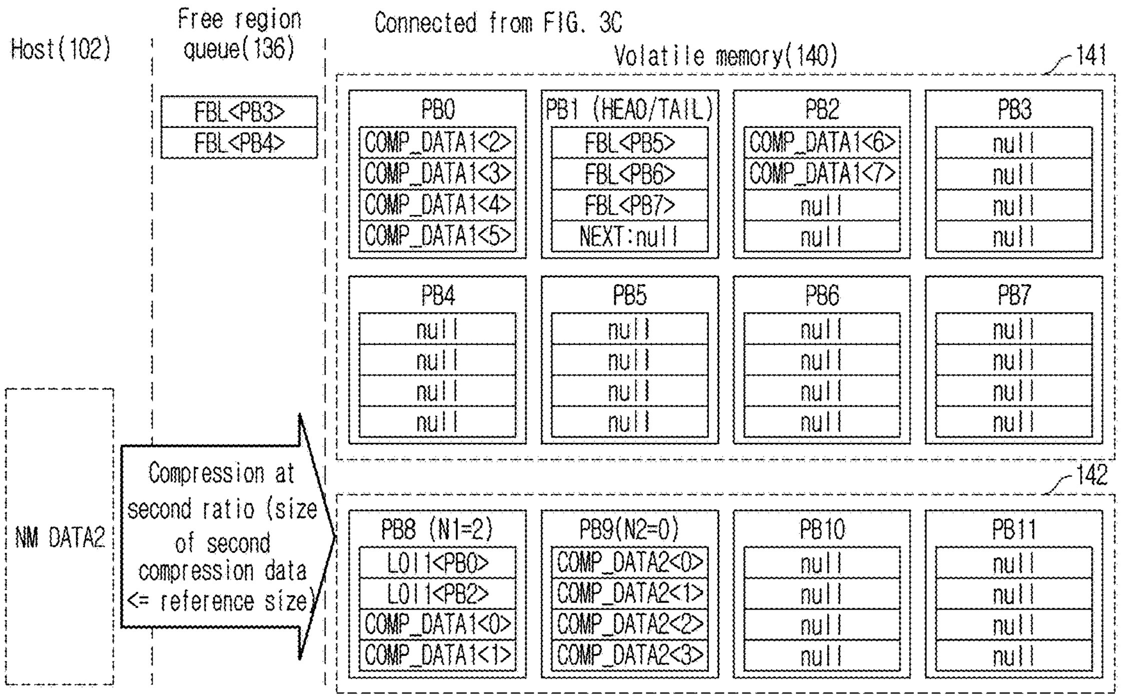

Referring to FIG. 3E, how second write data NM_DATA2 generated by the host 102 are managed in the storage device 110 when the second write data NM_DATA2 are compressed at the second ratio after the first write data NM_DATA1 generated by the host 102 are stored in the first retention regions PB<0, 2> of the volatile memory 140 as the first compression data COMP_DATA1<0:7> obtained by compressing the first write data NM_DATA1 at the first ratio FIG. 3C may be seen.

Specifically, the compression operation unit 132 included in the controller 130 may generate second compression data COMP_DATA2<0:3> by compressing the second write data NM_DATA2 transmitted by the host 102 at the second ratio. That is, the compression operation unit 132 may generate the second compression data COMP_DATA2<0:3> by compressing the second write data NM_DATA2 at the second ratio that is determined based on the properties of the second write data NM_DATA2, among a plurality of write data. The second compression data COMP_DATA2<0:3> generated by the compression operation unit 132 as described above may be divided into four partial data COMP_DATA2<0>, COMP_DATA2<1>, COMP_DATA2<2>, and COMP_DATA2<3>. Accordingly, the size of the second compression data COMP_DATA2<0:3>, that is, a second compression size, may be the size of four storage spaces.

The control operation unit 134 included in the controller 130 may compare the second compression size, that is, the size of the four storage spaces, with the reference size set as the size of four storage spaces, and may check that the second compression size is the same as the reference size based on the results of the comparison.

Accordingly, the control operation unit 134 might not set a second retention region, and might not generate second logical information. As described above, the control operation unit 134 may store all of the second compression data COMP_DATA2<0:3> in the four storage spaces included in the second selection region PB9 corresponding to the second write data NM_DATA2, that is, the second compression data COMP_DATA2<0:3>, among the four selection regions PB<8:11> previously assigned to the plurality of second physical regions 142, in the state in which a second retention region has not been set and second logical information has not been generated.

The control operation unit 134 may generate second number information N2 set as a value 0, in accordance with the second compression size being checked as being the same as the reference size.

The control operation unit 134 may store the second number information N2 set as the value 0 in the second selection region PB9 (N2=0).

Figure 3F:
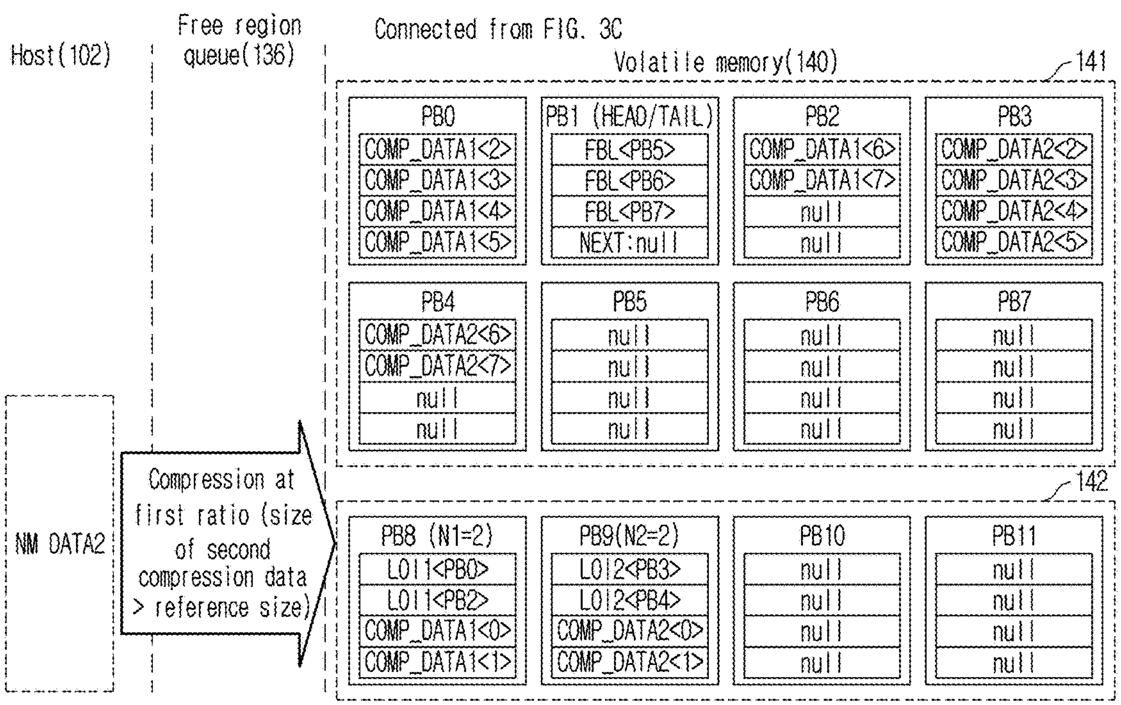

Referring to FIG. 3F, how the second write data NM_DATA2 generated by the host 102 are managed in the storage device 110 when the second write data NM_DATA2 are compressed at the first ratio after the first write data NM_DATA1 generated by the host 102 are stored in the first retention regions PB<0, 2> of the volatile memory 140 as the first compression data COMP_DATA1<0:7> obtained by compressing the first write data NM_DATA1 at the first ratio in FIG. 3C may be seen.

Specifically, the compression operation unit 132 included in the controller 130 may generate second compression data COMP_DATA2<0:7> by compressing the second write data NM_DATA2 transmitted by the host 102 at the first ratio. That is, the compression operation unit 132 may generate the second compression data COMP_DATA2<0:7> by compressing the second write data NM_DATA2 at the first ratio that is determined based on the properties of the second write data NM_DATA2, among a plurality of write data. The second compression data COMP_DATA2<0:7> generated by the compression operation unit 132 as described above may be divided into eight partial data COMP_DATA2<0>, COMP_DATA2<1>, COMP_DATA2<2>, COMP_DATA2<3>, COMP_DATA2<4>, COMP_DATA2<5>, COMP_DATA2<6>, and COMP_DATA2<7>. Accordingly, the size of the second compression data COMP_DATA2<0:7>, that is, a second compression size, may be the size of eight storage spaces.

The control operation unit 134 included in the controller 130 may compare the second compression size, that is, the size of the eight storage spaces, with the reference size set as the size of four storage spaces, and may check the second compression size is greater than the reference size based on the results of the comparison.

The control operation unit 134 may check that a difference between the second compression size and the reference size corresponds to the size of four storage spaces. Accordingly, the control operation unit 134 may set two regions PB<3:4>, among the plurality of first physical regions 141, as a second retention region.

The control operation unit 134 may generate the second number information N2 set as a value 2, in accordance with the two regions PB<3:4>, among the plurality of first physical regions 141, being set as the second retention region.

The control operation unit 134 may generate, as second logical information, two logical values LOI2<PB3> and LOI2<PB4> indicative of the two regions PB<3:4> set as the second retention region.

After setting the second retention region and generating the second logical information, the control operation unit 134 may store the two logical values LOI2<PB3> and LOI2<PB4> included in the second logical information, in two storage spaces, respectively, among the four storage spaces included in the second selection region PB9 corresponding to the second write data NM_DATA2, that is, the second compression data COMP_DATA2<0:7>, among the four selection regions PB<8:11> previously assigned to the plurality of second physical regions 142.

The control operation unit 134 may store some data items of the second compression data COMP_DATA2<0:7>, that is, the first and second data COMP_DATA2<0:1> of the second compression data COMP_DATA2<0:7>, in the remaining two storage spaces except the two storage spaces in which the second logical information has been stored, among the four storage spaces included in the second selection region PB9 corresponding to the second compression data COMP_DATA2<0:7>.

The control operation unit 134 may store the second number information N2 set as the value 2 in the second selection region PB9 (N1=1).

The control operation unit 134 may store the remaining data except the some data items COMP_DATA2<0:1> stored in the second selection region PB9, among the second compression data COMP_DATA2<0:7>, that is, the third to eighth data COMP_DATA2<2:7>, in the two regions PB<3:4> set as the second retention region. That is, the control operation unit 134 may store four data COMP_DATA2<2:5>, among the remaining data COMP_DATA2<2:7> of the second compression data COMP_DATA2<0:7>, in the four storage spaces included in the first region PB3, respectively, among the two regions PB<3:4> set as the second retention region. Furthermore, the control operation unit 134 may store the remaining two data COMP_DATA2<6:7> except the four data COMP_DATA2<2:5> stored in the first region PB3 of the second retention region, among the remaining data COMP_DATA2<2:7> of the second compression data COMP_DATA2<0:7>, in two storage spaces, among the four storage spaces included in the second region PB4 of the second retention region.

After storing the remaining data COMP_DATA2<2:7> of the second compression data COMP_DATA2<0:7> in the second retention region, the control operation unit 134 may invalidate information FBL<PB3:4> that belongs to the free region information and that corresponds to the second retention region in the free region queue 136 and the management region. That is, the control operation unit 134 may invalidate the information FBL<PB3:4> that belongs to the free region information managed in the free region queue 136 and the management region and that corresponds to the second retention region. According to an embodiment, as illustrated in FIG. 3F, in the case of the state in which the information FBL<PB3:4> corresponding to the second retention region has been stored in the free region queue 136, the control operation unit 134 may invalidate the information FBL<PB3:4> by deleting the information FBL<PB3:4> from the free region queue 136. According to another embodiment, unlike the operation in FIG. 3F, if information corresponding to the second retention region has been stored in a storage space included in the management region of the volatile memory 140, an operation of invalidating the information stored in the storage space may be an operation of overwriting the value of the storage space with a specific value, for example, a value "null" or setting the value of the storage space so that other data or information is subsequently overwritten by indicating that the value of the storage space is invalidated.

Figure 3G:
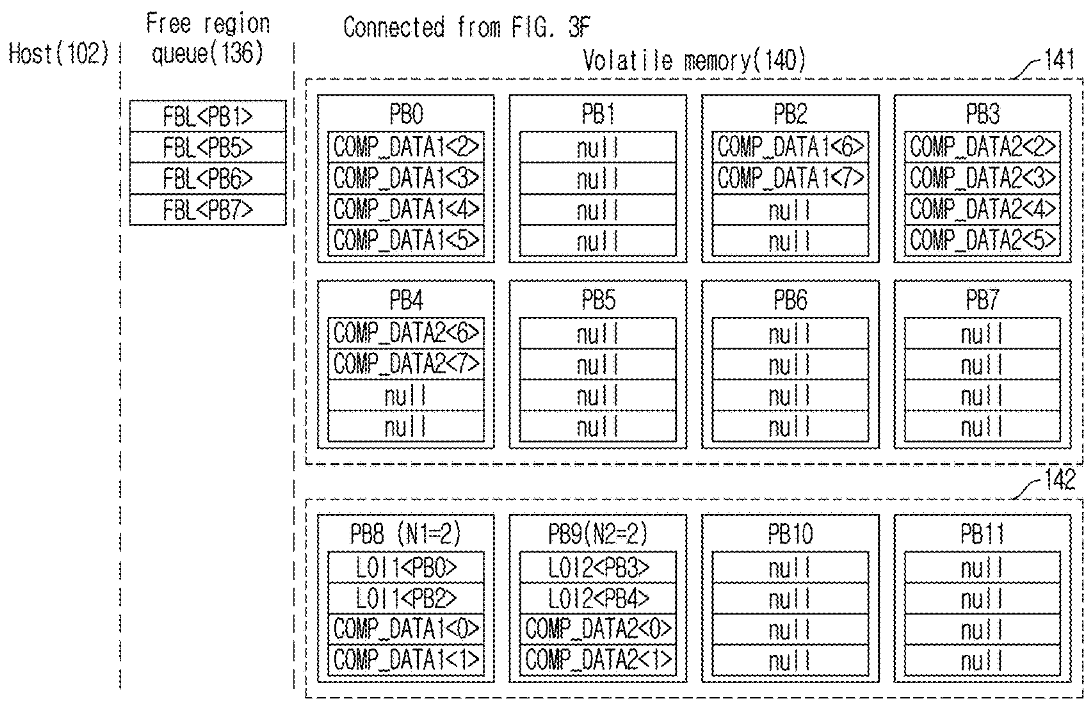

Referring to FIG. 3G, how some information items of the free region information stored in the management region of the volatile memory 140 is managed in the free region queue 136 assigned to the internal memory 137 by moving the some information items of the free region information to the free region queue 136 after the state described with reference to FIG. 3F may be seen.

Specifically, the control operation unit 134 may select some information items of the free region information managed in the management region of the volatile memory 140, and may move the some information items to the free region queue 136 assigned to the internal memory 137.

After moving the some information items of the free region information managed in the management region to the free region queue 136 assigned to the internal memory 137, the control operation unit 134 may change one physical region in which the some information items of the free region information has been stored, among the plurality of first physical regions 141 set as the management region, into a free region, may move information with regard to the changed free region to the free region queue 136, and may manage the information.

According to an embodiment, as illustrated in FIG. 3G, the control operation unit 134 may move some information items FBL<PB5:7> of the free region information stored in the second management region PB1 set as the management region to the free region queue 136, and may manage the some information items FBL<PB5:7>. In this case, the control operation unit 134 may check that "null" has been set in the next information NEXT of the second management region PB1 simultaneously set as the header HEAD and the tail TAIL in the management region, and may release the management region from the volatile memory 140.

After moving the some information items FBL<PB5:7> of the free region information stored in the second management region PB1 to the free region queue 136, the control operation unit 134 may change the second management region PB1 into a free region, may move information FBL<PB1> of the region PB1 changed into the free region to the free region queue 136, and may manage the information FBL<PB1> along with the some information items FBL<PB5:7>.

Figure 3H:
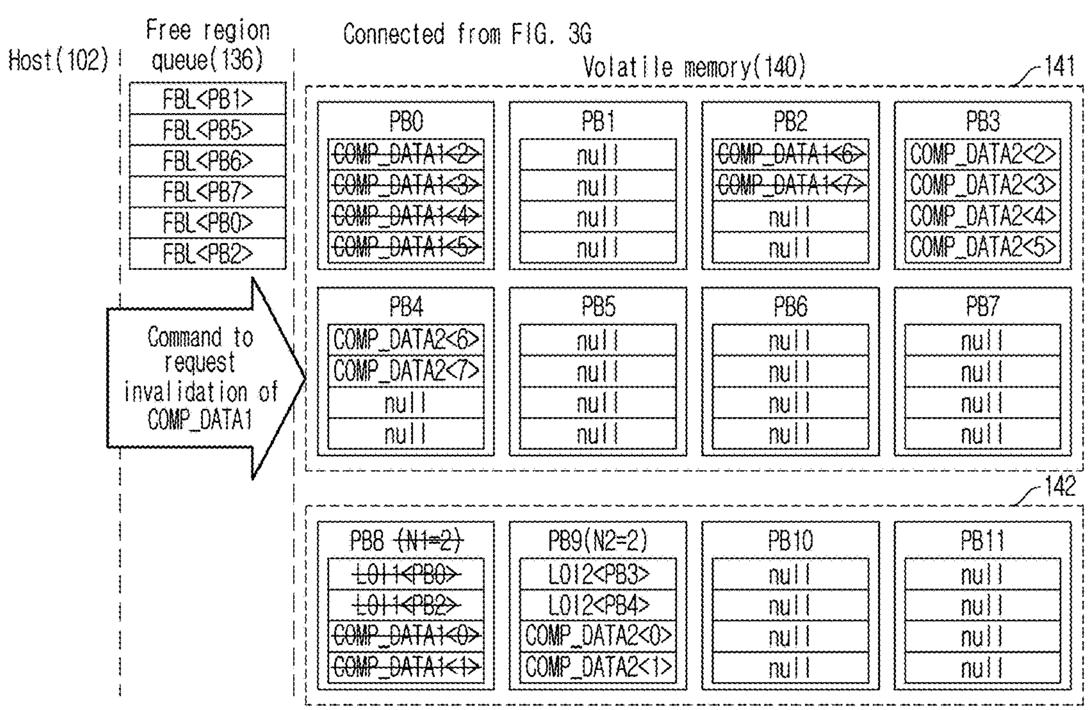

Referring to FIG. 3H, how the control operation unit 134 operates in response to a command to request the invalidation of the first compression data COMP_DATA1<0:7> after the state described with reference to FIG. 3G may be seen.

Specifically, the state described with reference to FIG. 3G may mean the state in which the first logical information LOI1<PB0, 2> and the first compression data COMP_DATA1<0:7> have been stored in the first selection region PB8 and first retention regions PB<0, 2> of the volatile memory 140, the second logical information LOI2<PB3:4> and the second compression data COMP_DATA2<0:7> have been stored in the second selection region PB9 and second retention regions PB<3:4> of the volatile memory 140, the management region of the volatile memory 140 has been released, and the free region information has been stored in the free region queue 136.

In such a state, the host 102 may generate a command to request the invalidation of the first compression data COMP_DATA1<0:7> stored in the volatile memory 140, and may transmit the command to the control operation unit 134 of the controller 130. The control operation unit 134 may invalidate the first logical information LOI1<PB0, 2> and the first compression data COMP_DATA1<0:7> stored in the first selection region PB8 and the first retention regions PB<0, 2>, in response to the command to request the invalidation of the first compression data COMP_DATA1<0:7>.

After invalidating the first logical information LOI1<PB0, 2> and the first compression data COMP_DATA1<0:7> in response to the command to request the invalidation of the first compression data COMP_DATA1<0:7>, the control operation unit 134 may change the first retention regions PB<0, 2> in which the remaining data COMP_DATA1<2:7> of the first compression data COMP_DATA1<0:7> have been stored into free regions, and may include the information FBL<PB0, 2> corresponding to the first retention regions PB<0, 2> in the free region information by storing the information FBL<PB0, 2> in the free region queue 136.

Accordingly, the information FBL<PB0, 2> moved to the free region queue 136 in FIG. 3H, along with the information FBL<PB1, 5:7> left in the free region queue 136 before FIG. 3H, may be managed in the free region queue 136 as free region information. In this case, the information FBL<PB1, 5:7> left in the free region queue 136 before FIG. 3H may be aligned in a form in which reference is made to the information FBL<PB1, 5:7> with higher priority than the information FBL<PB0, 2> moved to the free region queue 136 after FIG. 3H.

Figure 3I:
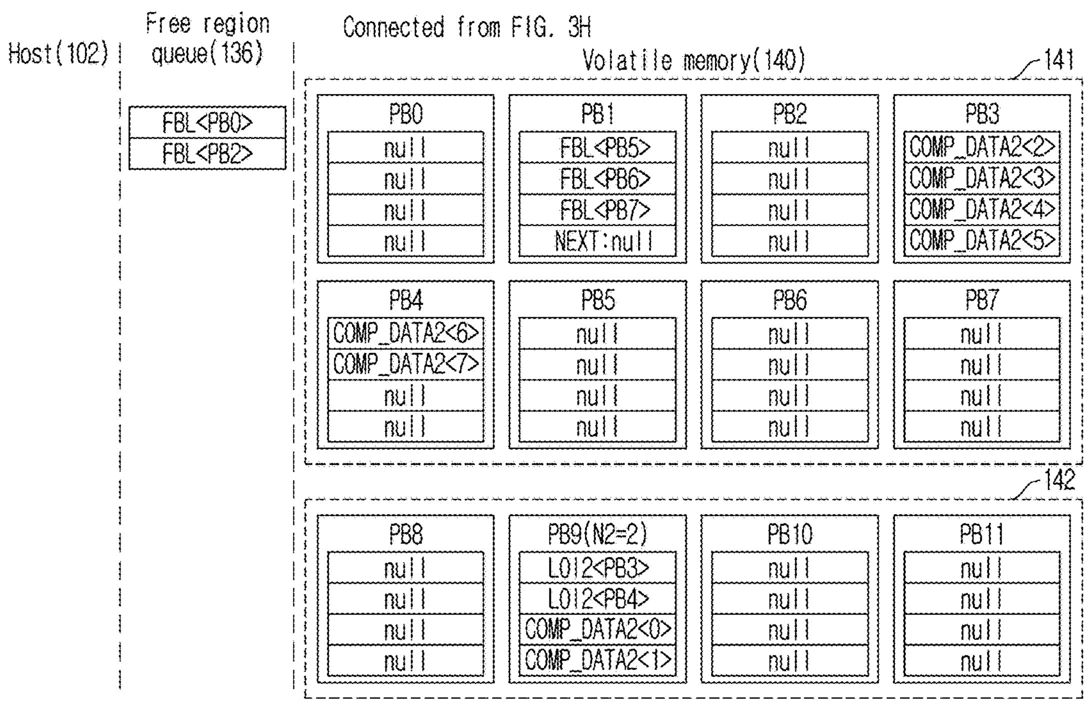

Referring to FIG. 3I, how some information items of the free region information stored in the free region queue 136 is managed in the management region of the volatile memory 140 by moving the some information items of the free region information to the management region of the volatile memory 140 may be seen.

Specifically, the internal memory 137 included in the control operation unit 134 may have a faster operating speed than the volatile memory 140, but may have a relatively smaller storage space size than the volatile memory 140. Accordingly, if the size of the free region queue 136 assigned to the internal memory 137 exceeds a reference size, free region information stored in the free region queue 136 may be managed in the management region of the volatile memory 140 by moving the free region information to the management region of the volatile memory 140.

More specifically, a state after FIG. 3H may be the state in which the entire free region information has been stored in the free region queue 136. Furthermore, the volatile memory 140 may be in the state in which the management region has been released.

In such a state, the control operation unit 134 may set some of the plurality of first physical regions 141 of the volatile memory 140 as a management region, and may manage some information items of the free region information stored in the free region queue 136 in the management region by moving the some information items of the free region information to the management region.

According to an embodiment, a state after FIG. 3H may be the state in which free region information of a total of six free regions PB<1, 5:7, 0, 2> has been stored in the free region queue 136. The control operation unit 134 may set, as a management region, the physical region PB1 of the volatile memory 140 corresponding to one piece of information FBL<PB1>, among the six pieces of information FBL<PB1, 5:7, 0, 2>, with reference to the free region information stored in the free region queue 136. In this case, the one physical region PB1 set as the management region may be set as a header HEAD and a tail TAIL, and "null" may be set in the next information NEXT.

Next, the control operation unit 134 may store three pieces of information FBL<PB5:7>, among the five pieces of information FBL<5:7, 0, 2>, in the one physical region PB1 set as the management region by moving the three pieces of information FBL<PB5:7> to the one physical region PB1 with reference to the free region information stored in the free region queue 136, and may manage only the remaining two pieces of information FBL<PB0, 2> in the free region queue 136.

Figure 3J:
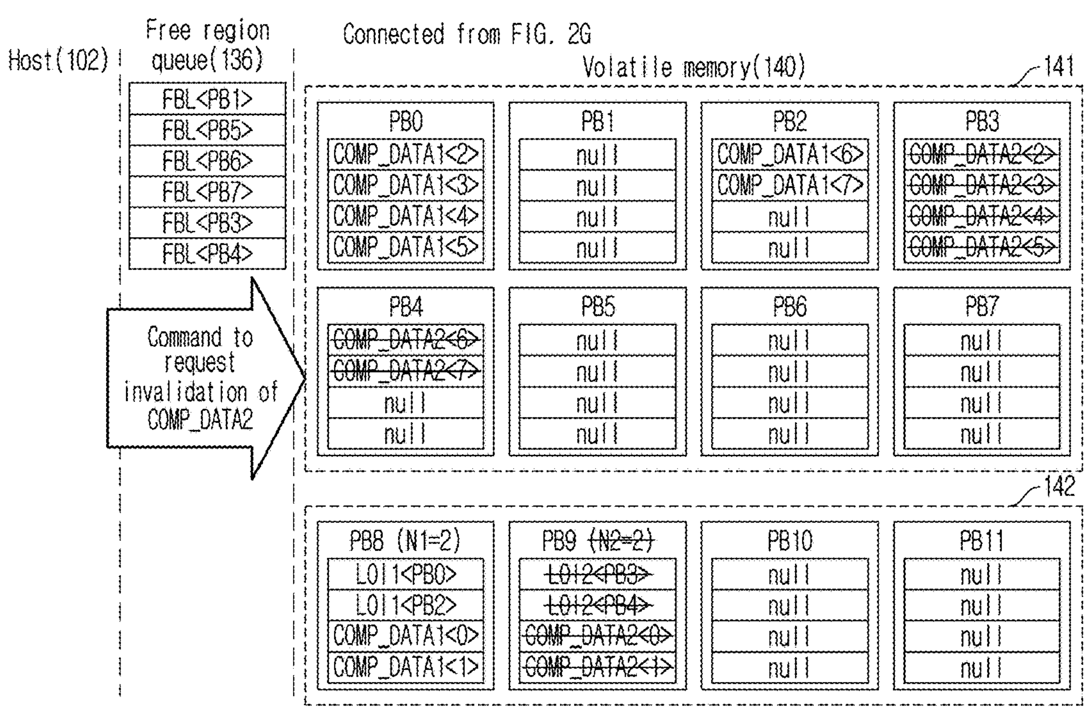

Referring to FIG. 3J, how the control operation unit 134 operates in response to a command to request the invalidation of the second compression data COMP_DATA2<0:7> after the state described with reference to FIG. 3G may be seen.

Specifically, the state described with reference to FIG. 3G may mean the state in which the first logical information LOI1<PB0, 2> and the first compression data COMP_DATA1<0:7> have been stored in the first selection region PB8 and first retention regions PB<0, 2> of the volatile memory 140, the second logical information LOI2<PB3:4> and the second compression data COMP_DATA2<0:7> have been stored in the second selection region PB9 and second retention regions PB<3:4> of the volatile memory 140, the management region of the volatile memory 140 has been released, and the free region information has been stored in the free region queue 136.

In such a state, the host 102 may generate a command to request the invalidation of the second compression data COMP_DATA2<0:7> stored in the volatile memory 140, and may transmit the command to the control operation unit 134 of the controller 130. The control operation unit 134 may invalidate the second logical information LOI2<PB3:4> and the second compression data COMP_DATA2<0:7> stored in the second selection region PB9 and the second retention regions PB<3:4>, in response to the command to request the invalidation of the second compression data COMP_DATA2<0:7>.

After invalidating the second logical information LOI2<PB3:4> and the second compression data COMP_DATA2<0:7> in response to the command to request the invalidation of the second compression data COMP_DATA2<0:7>, the control operation unit 134 may change the second retention regions PB<3:4> in which the remaining data COMP_DATA2<2:7> of the second compression data COMP_DATA2<0:7> have been stored into a free region, and may include the information FBL<PB3:4> corresponding to the second retention regions PB<3:4> in the free region information by storing the information FBL<PB3:4> in the free region queue 136.

Accordingly, the information FBL<PB3:4> moved to the free region queue 136 in FIG. 3G, along with the information FBL<PB1, 5:7> left in the free region queue 136 before FIG. 3G may be managed in the free region queue 136 as free region information. In this case, the information FBL<PB1, 5:7> left in the free region queue 136 before FIG. 3G may be aligned in a form in which reference is made to the information FBL<PB1, 5:7> with higher priority than the information FBL<PB3:4> moved to the free region queue 136 after FIG. 3G.

Figure 3K:
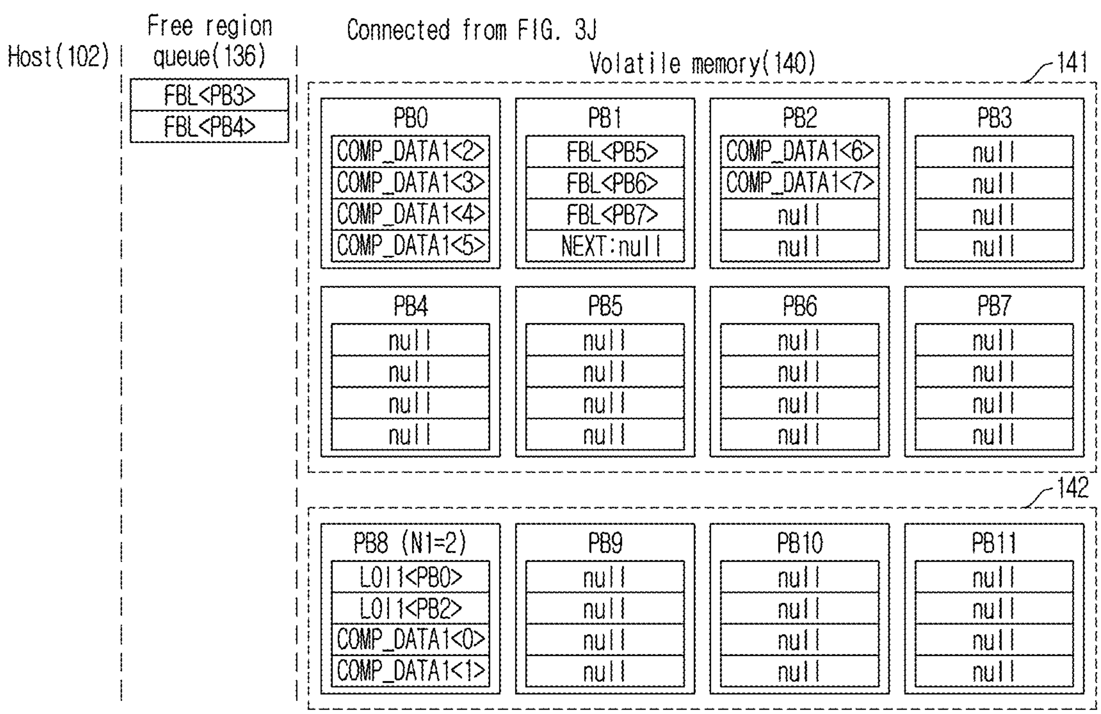

Referring to FIG. 3K, how some information items of the free region information stored in the free region queue 136 is managed in the management region of the volatile memory 140 by moving the some information items of the free region information to the management region of the volatile memory 140 may be seen.

Specifically, the internal memory 137 included in the control operation unit 134 has a faster operating speed than the volatile memory 140, but may have a relatively smaller storage space size than the volatile memory 140. Accordingly, if the size of the free region queue 136 assigned to the internal memory 137 exceeds a reference size, free region information stored in the free region queue 136 may be managed in the management region of the volatile memory 140 by moving the free region information to the management region of the volatile memory 140.

More specifically, a state after FIG. 3J may be the state in which the entire free region information has been stored in the free region queue 136. Furthermore, the volatile memory 140 may be in the state in which the management region has been released.

In such a state, after setting some of the plurality of first physical regions 141 of the volatile memory 140 as a management region, the control operation unit 134 may manage some information items of the free region information stored in the free region queue 136 in the management region by moving the some information items of the free region information to the management region.

According to an embodiment, a state after FIG. 3J may be the state in which free region information of a total of six free regions PB<1, 5:7, 3:4> has been stored in the free region queue 136. The control operation unit 134 may set the physical region PB1 of the volatile memory 140 corresponding to one piece of information FBL<PB1>, among the six pieces of information FBL<PB1, 5:7, 3:4>, as a management region with reference to the free region information stored in the free region queue 136. In this case, the one physical region PB1 set as the management region may be set as a header HEAD and a tail TAIL, and "null" may be set in the next information NEXT.

Next, the control operation unit 134 may store three pieces of information FBL<PB5:7>, among the five pieces of information FBL<5:7, 3:4>, in the one physical region PB1 set as the management region by moving the three pieces of information FBL<PB5:7> to the one physical region PB1 with reference to the free region information stored in the free region queue 136, and may manage only the remaining two pieces of information FBL<PB3:4> in the free region queue 136.

Although various embodiments have been described for illustrative purposes, it will be apparent to those skilled in the art that various changes and modifications may be made without departing from the spirit and scope of the invention as defined in the following claims.

What is claimed is:

1. A storage device comprising:

volatile memory comprising a plurality of physical regions each comprising a plurality of storage space;

a compression operation unit configured to generate compression data by compressing management request data, among a plurality of write data, wherein a compression size of the compression data is determined based on properties of the management request data; and a control operation unit configured to:

divide the plurality of physical regions into first and second physical regions;

assign, to the second physical regions, a plurality of selection regions based on an N reference storage space size in accordance with each of the plurality of write data;

set, as a retention region, M regions determined based on a difference between the compression size and the reference storage space size, among the first physical regions, when the compression size is greater than the reference storage space size;

generate logical information indicative of the retention region;

store multiple data items of the compression data and the logical information in a request selection region corresponding to the management request data, among the plurality of selection regions; and store remaining data items of the compression data in the retention region.

2. The storage device of claim 1, wherein the control operation unit is further configured to:

when the compression size is less than or equal to the reference storage space size, skip set the retention region, skip generate the logical information, and store all data items of the compression data in the request selection region.

3. The storage device of claim 2, wherein the control operation unit stores number information set as a value "M" in the request selection region when the compression size is greater than the reference storage space size, and stores the number information set as a value "0" in the request selection region when the compression size is less than or equal to the reference storage space size.

4. The storage device of claim 3, wherein the control operation unit enters one of a first read mode and a second read mode based on the number information stored in the request selection region after a start of a read operation on the compression data, sequentially reads, in the first read mode, the compression data from the request selection region, and sequentially reads, in the second read mode, the compression data from each of the request selection region and the retention region based on the logical information stored in the request selection region.

5. The storage device of claim 3, wherein the control operation unit sets multiple free regions that belong to a number of free regions, as a management region, in order to store free region information of the free regions capable of storing data, among the first physical regions, and manages the multiple free regions set as the management region in a connection list form.

6. The storage device of claim 5, wherein the control operation unit selects M regions of the free regions as the retention region based on the free region information when the compression size is greater than the reference storage space size, and invalidates information items that belongs to the free region information and corresponds to the retention region in the management region.

7. The storage device of claim 6, wherein the control operation unit enters one of a first invalidation mode and a second invalidation mode based on the number information stored in the request selection region after a start of an invalidation operation for the compression data, invalidates, in the first invalidation mode, all data items of the compression data stored in the request selection region, and invalidates, in the second invalidation mode, the logical information and the compression data stored in the request selection region and the retention region based on the logical information stored in the request selection region, changes the retention region into the free region, and includes the information items corresponding to the retention region in the free region information.

8. The storage device of claim 7, wherein the control operation unit checks a number of the free regions, among the first physical regions, and varies a number of regions set as the management region, among the number of free regions.

9. The storage device of claim 8, wherein the control operation unit comprises internal memory to which a space for storing a free region queue is assigned and which has a fast operating speed than the volatile memory, and manages multiple information items of the free region information in the free region queue by moving the multiple information items to the free region queue.

10. The storage device of claim 9, wherein after moving the multiple information items to the free region queue, the control operation unit changes, into the free region, one region in which the multiple information items has been stored, among the first physical regions set as the management region, and manages information items with regard to the changed free region in the free region queue along with the multiple information items by moving the information items to the free region queue.

11. An operating method of a storage device comprising volatile memory comprising a plurality of physical regions each comprising a plurality of storage space, the operating method comprising:

dividing the plurality of physical regions into first and second physical regions and assigning, to the second physical regions, a plurality of selection regions based on an N reference storage space size in accordance with each of a plurality of write data;

generating compression data by compressing management request data, among the plurality of write data, wherein a compression size of the compression data is determined based on properties of the management request data;

setting, as a retention region, M regions determined based on a difference between the compression size and the reference storage space size, among the first physical regions, when the compression size is greater than the reference storage space size;

generating logical information indicative of the retention region;

storing multiple data items of the compression data and the logical information in a request selection region corresponding to the management request data, among the plurality of selection regions; and storing remaining data items of the compression data in the retention region.

12. The operating method of claim 11, further comprising:

when the compression size is less than or equal to the reference storage space size, storing all data items of the compression data in the request selection region after skipping of setting the retention region and generating the logical information.

13. The operating method of claim 12, further comprising:

storing number information set as a value "M" in the request selection region when the compression size is greater than the reference storage space size; and storing the number information set as a value "0" in the request selection region when the compression size is less than or equal to the reference storage space size.

14. The operating method of claim 13, further comprising:

entering one of a first read mode and a second read mode based on the number information stored in the request selection region after a start of a read operation on the compression data;

sequentially reading, in the first read mode, the compression data from the request selection region; and sequentially reading, in the second read mode, the compression data from each of the request selection region and the retention region based on the logical information stored in the request selection region.

15. The operating method of claim 13, further comprising:

setting multiple free regions that belong to a current number of free regions in order to store free region information of the free regions capable of storing data, among the first physical regions, as a management region, and managing the multiple free regions set as the management region in a connection list form.

16. The operating method of claim 15, further comprising:

when the compression size is greater than the reference storage space size, selecting M regions, among the free regions, as the retention region based on the free region information, and invalidating information items that belongs to the free region information and corresponds to the retention region in the management region.

17. The operating method of claim 16, further comprising:

entering one of a first invalidation mode and a second invalidation mode based on the number information stored in the request selection region after a start of an invalidation operation for the compression data;

invalidating, in the first invalidation mode, all data items of the compression data stored in the request selection region; and invalidating, in the second invalidation mode, the logical information and the compression data stored in the request selection region and the retention region based on the logical information stored in the request selection region, changing the retention region into the free region, and including the information items corresponding to the retention region in the free region information.

18. The operating method of claim 17, wherein the managing of the multiple free regions comprises:

checking a number of the free regions, among the first physical regions, and varying a number of regions set as the management region, among the number of free regions.

19. The operating method of claim 18, wherein:

internal memory which has a faster operating speed than the volatile memory, which is physically divided, and to which a space for storing a free region queue has been assigned is further included in the storage device, and the operating method further comprises managing multiple information items of the free region information in the free region queue by moving the multiple information items to the free region queue.

20. The operating method of claim 19, further comprising:

after moving the multiple information items to the free region queue, changing, into the free region, one region in which the multiple information items has been stored, among the first physical regions set as the management region, and managing information items with regard to the changed free region in the free region queue along with the multiple information items by moving the information items to the free region queue.

* * * * *